(12) United States Patent
Kubota et al.

(10) Patent No.: US 9,703,075 B2
(45) Date of Patent: *Jul. 11, 2017

(54) IMAGING LENS

(71) Applicants: OPTICAL LOGIC INC., Nagano (JP); Kantatsu Co., Ltd., Tochigi (JP)

(72) Inventors: Yoji Kubota, Nagano (JP); Kenichi Kubota, Nagano (JP); Hitoshi Hirano, Nagano (JP); Yoshio Ise, Tochigi (JP); Sayuri Noda, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 301 days.

This patent is subject to a terminal disclaimer.

(21) Appl. No.: 14/559,953

(22) Filed: Dec. 4, 2014

(65) Prior Publication Data

US 2015/0138650 A1    May 21, 2015

Related U.S. Application Data

(63) Continuation of application No. 14/479,425, filed on Sep. 8, 2014, now Pat. No. 9,042,033, which is a continuation of application No. 13/865,594, filed on Apr. 18, 2013, now Pat. No. 8,861,095.

(30) Foreign Application Priority Data

May 22, 2012    (JP) ................................ 2012-116110

(51) Int. Cl.
*G02B 13/08*    (2006.01)
*G02B 13/00*    (2006.01)
*G02B 13/18*    (2006.01)
*G02B 9/62*    (2006.01)
*G02B 5/00*    (2006.01)
*G02B 27/00*    (2006.01)

(52) U.S. Cl.
CPC ......... *G02B 13/0045* (2013.01); *G02B 5/005* (2013.01); *G02B 9/62* (2013.01); *G02B 13/0015* (2013.01); *G02B 13/18* (2013.01); *G02B 27/0025* (2013.01)

(58) Field of Classification Search
CPC .................................................. G02B 13/0045
USPC ........................................ 359/713, 756, 757
See application file for complete search history.

(56) References Cited

U.S. PATENT DOCUMENTS

2013/0070346 A1    3/2013 Hsu et al.
2013/0235473 A1    9/2013 Chen et al.
(Continued)

FOREIGN PATENT DOCUMENTS

JP    2011-145315 A    7/2011

*Primary Examiner* — Scott J Sugarman
(74) *Attorney, Agent, or Firm* — Kubotera & Associates, LLC

(57) ABSTRACT

An imaging lens includes a first lens having positive refractive power; a second lens having negative refractive power; a third lens; a fourth lens having negative refractive power; a fifth lens having positive refractive power; and a sixth lens, arranged in this order from an object side to an image plane side. The first lens is formed so that a surface thereof on the object side has a positive curvature radius. The sixth lens is formed so that a surface thereof on the object side and a surface thereof on the image plane side have positive curvature radii. Each of the first to sixth lenses has an Abbe's number within a specific range.

20 Claims, 18 Drawing Sheets

(56) References Cited

U.S. PATENT DOCUMENTS

2014/0063616 A1 3/2014 Okano et al.
2014/0211326 A1* 7/2014 Lai .................... G02B 13/0045
359/713

* cited by examiner

IMAGING LENS

CROSS-REFERENCE TO RELATED APPLICATIONS

This is a continuation application of a prior application Ser. No. 14/479,425, filed on Sep. 8, 2014, pending, which is a continuation application of a prior application Ser. No. 13/865,594, filed on Apr. 18, 2013, allowed.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera mounted in a portable device including a cellular phone and a portable information terminal, a digital still camera, a security camera, a vehicle onboard camera, and a network camera.

In these years, in place of cellular phones that are intended mainly for making phone calls, so-called "smartphones" have been more widely used, i.e., cellular phones with such functions as those of portable information terminals (PDA) and/or personal computers. Since the smartphones generally have more functions than those of the cellular phones, it is possible to use images taken by a camera thereof in various applications. For example, while it is possible to use the smartphones for printing and enjoying images taken, it is also possible to use images in other usage such as processing images to use for game characters or for makeup simulations, dress fitting simulations, and the others. The ways of the image usage were not conventionally common, however, it becomes more common mainly among young people.

Generally speaking, a product group of cellular phones and smartphones is often composed of products with various specifications including from the ones for beginners to the ones for advanced users. Among them, an imaging lens to be mounted in the cellular phone or the smartphone, which is developed for advanced users, is required to have a high resolution lens configuration so as to be also applicable to a high pixel count imaging element of these days. However, as the imaging lens to be mounted in smartphones used for the above-described usages, it is critical to have a small size with a wide angle of view, that is, a wide angle, rather than having a high resolution. Especially in these days, with downsizing and high functionality of smartphones, there are demands for an imaging lens having even smaller size and wider angle.

However, it is also true that even products for beginners are required to have some high resolution. In case of a lens configuration composed of six lenses, since the number of lenses that compose an imaging lens is many, although it is somewhat disadvantageous for downsizing of the imaging lens, since there is high flexibility upon designing, it has potential of attaining satisfactory aberration correction and downsizing in a balanced manner. For example, as a lens configuration composed of six lenses, an imaging lens described in Patent Reference is known.

The imaging lens described in Patent Reference includes a first lens that is negative and has a shape of a meniscus lens directing a convex surface thereof to an object side; a bonded lens composed of two lenses, positive and negative lenses; and a positive fourth lens; a bonded lens composed of two lenses, positive and negative lenses, arranged.

According to the imaging lens of Patent Reference, satisfying conditional expression related to curvature radii of an object-side surface and an image plane-side surface of the first lens and a conditional expression related to the two bonded lenses, respectively, it is achievable to satisfactorily correct a distortion and a chromatic aberration.

Patent Reference: Japanese Patent Application Publication No. 2011-145315

However, in case of the imaging lens of Patent Reference, since a distance from an object-side surface of the first lens to an image plane of an imaging element is long, it is necessary to bend an optical path by arranging a prism or a mirror between an imaging lens and an image plane, in order to mount the imaging lens in a small-sized camera such as a cellular phone or a smartphone. High functionality and downsizing of cellular phones and smartphones have been advanced every year, and the level of downsizing required for an imaging lens is even higher than before. With the lens configuration described in Patent Reference, it is difficult to attain satisfactory aberration correction while attaining downsizing of the imaging lens so as to meet the demands.

Here, such challenge is not a problem specific to the imaging lens to be mounted in cellular phones and smartphones, and rather, it is a common problem even for an imaging lens to be mounted in a relatively small camera such as digital still cameras, portable information terminals, security cameras, vehicle onboard cameras, and network cameras.

In view of the above-described problems in the conventional techniques, an object of the invention is to provide an imaging lens that can satisfactorily correct aberrations. A further object of the invention is to provide an imaging lens that can attain both downsizing of the imaging lens and satisfactory aberration correction.

Further objects and advantages of the invention will be apparent from the following description of the invention.

SUMMARY OF THE INVENTION

In order to attain the objects described above, according to a first aspect of the invention, an imaging lens includes a first lens having positive refractive power; a second lens having negative refractive power; a third lens; a fourth lens having negative refractive power; a fifth lens having positive refractive power; and a sixth lens, arranged in this order from an object side to an image plane side. The first lens has an object-side surface having a positive curvature radius. The second lens has an image plane-side surface having a positive curvature radius. The fifth lens has an object-side surface and an image plane-side surface, both of which have negative curvature radii. In addition, each lens from the third lens through the sixth lens has weaker refractive power than that of each of the first lens and the second lens.

According to the first aspect of the present invention, in the imaging lens having the above-described configuration, the first lens and the second lens have stronger refractive power than that of each of other lenses. Accordingly, aberrations are roughly corrected with those two lenses, and aberrations not corrected with the first lens and the second lens are more finely corrected with the third to the sixth lenses that have weaker refractive power than the first and the second lenses. Therefore, it is possible to mainly correct axial aberrations in the first lens and the second lens, and to mainly correct off-axis aberrations in the third to the sixth lenses, so that it is possible to satisfactorily correct aberrations in a balanced manner in the whole lens system. Moreover, since the first lens and the second lens, which are arranged on the object side in the imaging lens, have relatively strong refractive power, it is possible to contribute to satisfactory correction of aberrations and also to downsizing of the imaging lens.

According to a second aspect of the present invention, in the imaging lens having the above-described configuration, the fourth lens may be preferably formed in a shape such that curvature radii of an object side-surface and the image plane-side surface are both negative. As described above, the fifth lens is formed in a shape such that curvature radii of the object-side surface and the image plane-side surface are both negative. Forming the fourth lens in a similar shape to that of the fifth lens, i.e., a shape of a meniscus lens directing a concave surface thereof to the object side near an optical axis, it is possible to further satisfactorily correct aberrations.

According to a third aspect of the present invention, in the imaging lens having the above-described configuration, the sixth lens may be preferably formed in a shape such that curvature radii of the object-side surface and the image plane-side surface are both positive.

According to the imaging lens having the above-described configuration, the fifth lens and the sixth lens are preferably formed as aspheric shapes such that an object-side surface thereof and an image plane-surface thereof have an inflexion point. According to the imaging lens of the invention, the third to the sixth lenses serve for satisfactorily correcting off-axis aberrations as well as axial aberrations. The fifth lens and the sixth lens, which are close to the image plane, especially play a significant role in correcting off-axis aberrations. Forming each of the fifth lens and the sixth lens as aspheric shapes having an inflexion point, it is possible to satisfactorily correct off-axis aberrations, and also to easily restrain an incident angle of a light beam emitted from the imaging lens to the image plane within a range set in advance. An imaging lens of a CCD sensor, a CMOS sensor or the like, a range of incident angle of a light beam that can be taken in a sensor (so-called "chief ray angle") is set in advance. By restraining the incident angle of a light beam emitted from an imaging lens to an image plane within the range set in advance, it is possible to restrain generation of shading, i.e., a phenomenon that causes a dark periphery of an image.

According to a fourth aspect of the present invention, when the first lens has a focal length f1 and the second lens has a focal length f2, the imaging lens having the above-described configuration preferably satisfies the following conditional expression (1):

$$-0.7 < f1/f2 < -0.3 \quad (1)$$

When the imaging lens satisfies the conditional expression (1), it is possible to suitably attain downsizing of the imaging lens while satisfactorily correcting chromatic aberration and astigmatism. When the value exceeds the upper limit of "−0.3", since the negative refractive power of the second lens is relatively weaker than the positive refractive power of the first lens, although it is advantageous for downsizing of the imaging lens, it is difficult to secure a back focal length. In addition, since an axial chromatic aberration is insufficiently corrected (a focal position at a short wavelength moves towards the object side relative to a focal position at a reference wavelength) and an astigmatic difference increases, it is difficult to obtain satisfactory image-forming performance. On the other hand, when the value is below the lower limit of "−0.7", since the refractive power of the second lens is relatively stronger than that of the first lens, although it is easy to secure back focal length, it is difficult to attain downsizing of the imaging lens.

Moreover, the axial chromatic aberration is excessively corrected (a focal position at a short wavelength moves towards the image plane side relative to a focal position at a reference wavelength) and an off-axis chromatic aberration of magnification is excessively corrected (an image-forming point at a short wavelength moves in a direction to be away from an optical axis relative to an image-forming point at a reference wavelength). In addition, since astigmatism increases, also in this case, it is difficult to obtain satisfactory image-forming performance.

According to a fifth aspect of the present invention, when a whole lens system has a focal length f, and a composite focal length of the first lens and the second lens is f12, the imaging lens having the above-described configuration preferably satisfies the following conditional expression (2):

$$0.8 < f12/f < 1.5 \quad (2)$$

When the imaging lens satisfies the conditional expression (2), it is possible to restrain the axial chromatic aberration, a coma aberration, and the astigmatism within a satisfactory range, while attaining downsizing of the imaging lens. When the value exceeds the upper limit of "1.5", the negative refractive power of the second lens is strong relative to the positive refractive power of the first lens, and although it is easy to correct an axial chromatic aberration, but it is difficult to attain downsizing of the imaging lens. In addition, since the astigmatic difference increases, it is difficult to obtain satisfactory image-forming performance. When the value is below the lower limit of "0.8", since the positive refractive power of the first lens is relatively strong, although it is advantageous for downsizing of the imaging lens, the back focal length is short, so that it is difficult to secure space for disposing an insert such as an infrared cut-off filter. Furthermore, the axial chromatic aberration is insufficiently corrected and the coma aberration increases, so that it is difficult to obtain satisfactory image-forming performance.

According to a sixth aspect of the present invention, when a whole lens system has a focal length f and the fourth lens has a focal length f4, the imaging lens having the above-described configuration preferably satisfies the following conditional expression (3):

$$-0.3 < f/f4 < -0.01 \quad (3)$$

When the imaging lens satisfies the conditional expression (3), it is possible to restrain a distortion and a field curvature within satisfactory ranges while attaining downsizing of the imaging lens. In addition, it is also possible to restrain the incident angle of a light beam emitted from the imaging lens to an imaging element within a range set in advance. According to the imaging lens of the invention, the fourth lens has negative refractive power. Restraining the negative refractive power of the fourth lens within the range of the conditional expression, it is possible to restrain aberrations within satisfactory ranges. When the value exceeds the upper limit of "−0.01", although it is advantageous for downsizing of the imaging lens, it is difficult to secure the back focal length. In addition, a minus distortion increases at a periphery of an image plane and a periphery of the image surface curves to the minus direction, so that it is difficult to obtain satisfactory image-forming performance. On the other hand, when the value is below the lower limit of "−0.3", since a distance from an image plane to an exit pupil is long, although it is easy to restrain the incident angle of a light beam emitted from the imaging lens to the imaging element within the range set in advance, the image surface curves in a plus direction and the plus distortion increases, so that it is difficult to obtain image-forming performance also in this case.

According to a seventh aspect of the present invention, when a whole lens system has a focal length f and a composite focal length of the third lens and the fourth lens is f34, the imaging lens having the above-described configuration preferably satisfies the following conditional expression (4):

$$-20.0 < f34/f < -1.0 \quad (4)$$

When the imaging lens satisfies the conditional expression (4), it is possible to restrain the chromatic aberration, the field curvature, and the astigmatism within satisfactory ranges. In addition, it is also possible to restrain the incident angle of a light beam emitted from the imaging lens to the imaging element within a range set in advance. When the value exceeds the upper limit of "−1.0", since a distance from an image plane to an exit pupil is long, it is easy to restrain the incident angle of a light beam emitted from the imaging lens to the imaging element within a range set in advance. However, the axial chromatic aberration and the chromatic aberration of magnification are excessively corrected and a plus distortion increases, it is difficult to obtain satisfactory image-forming performance. On the other hand, when the value is below the lower limit of "−20.0", the axial chromatic aberration is insufficiently corrected. In addition, a sagittal image surface curves to the object side (in a minus direction) and the astigmatic difference increases, so that it is difficult to obtain satisfactory image-forming performance.

According to an eighth aspect of the present invention, when a distance on the optical axis from the image plane-side surface of the second lens to the object-side surface of the third lens is D23 and a distance on the optical axis from the object-side surface of the first lens to the image plane-side surface of the sixth lens is L16, the imaging lens having the above-described configuration preferably satisfies the following conditional expression (5):

$$0.05 < D23/L16 < 0.3 \quad (5)$$

When the imaging lens satisfies the conditional expression (5), it is possible to restrain a spherical aberration within a satisfactory range while attaining downsizing of the imaging lens. In addition, it is also possible to restrain the incident angle of a light beam emitted from the imaging lens to the imaging element within a range set in advance. When the value exceeds the upper limit of "0.3", although it is easy to restrain the spherical aberration within a satisfactory range and restrain the incident angle of a light beam emitted from the imaging lens to the imaging element within the range set in advance, it is difficult to secure the back focal length. On the other hand, when the value is below the lower limit of "0.05", although it is advantageous for downsizing of the imaging lens, a spherical aberration increases and it is difficult to obtain satisfactory image-forming performance. In addition, it is difficult to restrain the incident angle of a light beam emitted from the imaging lens to the imaging element within the range set in advance.

According to a ninth aspect of the present invention, when the first lens has an Abbe's number vd1, the fourth lens has an Abbe's number vd4, the fifth lens has an Abbe's number vd5, and the sixth lens has an Abbe's number vd6, the imaging lens having the above-described configuration preferably satisfies the following conditional expressions (6) through (9):

$$45 < vd1 < 75 \quad (6)$$

$$45 < vd4 < 75 \quad (7)$$

$$45 < vd5 < 75 \quad (8)$$

$$45 < vd6 < 75 \quad (9)$$

When the imaging lens satisfies the conditional expressions (6) through (9), it is possible to satisfactorily correct the axial and the off-axis chromatic aberrations. Having the Abbe's numbers of four lenses in the six lenses larger than the lower limit of "45", it is possible to effectively restrain the chromatic aberration generated in those four lenses, so that it is possible to suitably restrain the chromatic aberration of the whole lens system within satisfactory range. Moreover, having the Abbe's number of each lens smaller than the upper limit of "75", it is possible to restrain cost of lens materials.

According to a tenth aspect of the present invention, in order to more satisfactorily correct the axial and the off-axis chromatic aberrations, when the second lens has an Abbe's number vd2 and the third lens has an Abbe's number vd3, the imaging lens having the above-described configuration preferably satisfies the conditional expressions (10) and (11):

$$20 < vd2 < 40 \quad (10)$$

$$20 < vd3 < 40 \quad (11)$$

According to the imaging lens of the invention, it is possible to provide an imaging lens with satisfactorily corrected aberrations. In addition, it is possible to provide a small-sized imaging lens especially suitable for mounting in a small-sized camera, while having high resolution with satisfactorily corrected aberrations.

DETAILED DESCRIPTION OF PREFERRED EMBODIMENTS

Hereunder, referring to the accompanying drawings, embodiments of the present invention will be fully described.

FIGS. 1, 4, 7, 10, 13, and 16 are schematic sectional views of imaging lenses in Numerical Data Examples 1 to 6 according to the embodiment, respectively. Since a basic lens configuration is the same among those Numerical Data Examples, the lens configuration of the embodiment will be described with reference to the illustrative sectional view of Numerical Data Example 1.

Figure 1:
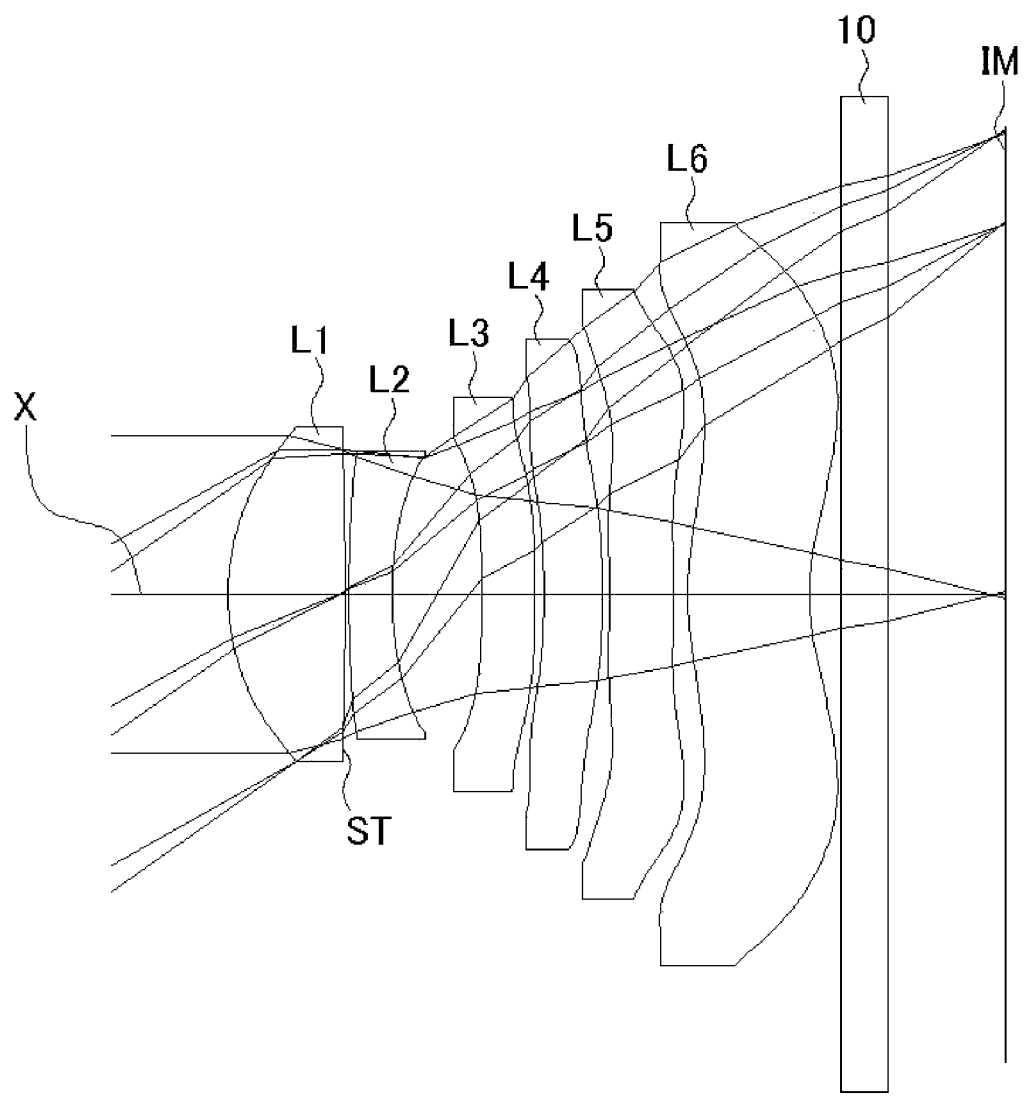
FIG. 1 shows a sectional view of a schematic configuration of an imaging lens in Numerical Data Example 1 according to an embodiment of the invention.

As shown in FIG. 1, the imaging lens of the embodiment includes a first lens L1 having positive refractive power; a second lens L2 having negative refractive power; a third lens L3; a fourth lens L4 having negative refractive power; a fifth lens L5 having positive refractive power; and a sixth lens L6, arranged in the order from an object side to an image plane side. The imaging lenses of Numerical Data Examples 1 to 5 are examples in which the third lens L3 has negative refractive power, and the imaging lens of Numerical Data Example 6 is an example in which the third lens L3 has positive refractive power. The imaging lenses of Numerical Data Examples 1 to 5 are also examples in which the sixth lens L6 has negative refractive power, and the imaging lens of Numerical Data Example 6 is an example in which the sixth lens L6 has positive refractive power. Here, a filter 10 is disposed between the sixth lens L6 and an image plane IM. This filter 10 can be optionally omitted.

According to the imaging lens of the embodiment, refractive power of each lens from the third lens L3 to the sixth lens L6 is weaker than that of each refractive power of the first lens L1 and the second lens L2. In other words, when the first lens L1 has a focal length f1, the second lens L2 has a focal length f2, the third lens L3 has a focal length f3, the fourth lens L4 has a focal length f4, the fifth lens L5 has a focal length f5, and the sixth lens has a focal length f6, the imaging lens of the embodiment satisfies the relation, (f1, |f2|)<(|f3|, |f4|, f5, |f6|).

According to the imaging lens having the above-described configuration, the first lens L1 is formed in a shape such that a curvature radius r1 of an object-side surface thereof is positive and a curvature radius r2 of an image plane-side surface thereof is negative, so as to be a shape of a biconvex lens near an optical axis X. The shape of the first lens L1 is not limited to the one in Numerical Data Example 1. The shape of the first lens L1 can be any as long as the curvature radius r1 of the object-side surface thereof is positive. The imaging lenses of Numerical Data Examples 1, 3, 5, and 6 are examples in which the shape of the first lens L1 has a shape of a biconvex lens near the optical axis X, and the imaging lenses of Numerical Data Examples 2 and 4 are examples in which the first lens L1 is formed in a shape such that the curvature radius r1 of the object side surface thereof and the curvature radius r2 of the image plane-side surface thereof are both positive, i.e. a shape of a meniscus lens directing a convex surface thereof to the object side near the optical axis X. Here, in the embodiment, a stop ST is provided on the image plane-side surface of the first lens L1.

The second lens L2 is formed in a shape such that a curvature radius r3 of an object-side surface thereof and a curvature radius r4 of an image plane-side surface thereof are both positive, so as to be a shape of a meniscus lens directing a convex surface thereof to the object side near the optical axis X. The shape of the second lens L2 can be any as long as the curvature radius r4 of the image plane-side surface is positive, and can be the one in which the curvature radius r3 of the object side-surface thereof is negative, i.e. a biconcave lens near the optical axis X.

The third lens L3 is formed in a shape such that a curvature radius r5 of an object-side surface thereof and a curvature radius r6 of an image plane-side surface thereof are both negative, so as to be a shape of a meniscus lens directing a concave surface thereof to the object side near the optical axis X. The shape of the third lens L3 is not limited to the one in Numerical Data Example 1. The imaging lenses of Numerical Data Examples 1 and 3 to 6 are examples in which the shape of the third lens L3 is a shape of a meniscus lens directing a concave surface thereof to the object side near the optical axis X, and the imaging lens of Numerical Data Example 2 is an example in which the shape of the third lens L3 is a shape of a meniscus lens directing a convex surface thereof to the object side near the optical axis X.

The fourth lens L4 is formed in a shape such that a curvature radius r7 of an object-side surface thereof and a curvature radius r8 of an image plane-side surface thereof are both negative, so as to be a shape of a meniscus lens directing a concave surface thereof to the object side near the optical axis X. In addition, the shape of the fourth lens L4 can be a shape of a meniscus lens directing a convex surface thereof to the object side near the optical axis X, or a shape of a biconcave lens near the optical axis X. The fourth lens L4 can be formed in various shapes as long as the refractive power thereof is negative.

The fifth lens L5 is formed in a shape such that a curvature radius r9 of an object-side surface thereof and a curvature radius r10 of an image plane-side surface thereof are both negative, so as to be a shape of a meniscus lens directing a concave surface thereof to the object side near the optical axis X. The sixth lens L6 is formed in a shape such that a curvature radius r11 of an object-side surface thereof and a curvature radius r12 of an image plane-side surface thereof are both positive, so as to be a shape of a meniscus lens directing a convex surface thereof to the object side near the optical axis X.

According to the imaging lens of the embodiment, the fifth lens L5 and the sixth lens L6 are formed as aspheric shapes such that an object-side surface thereof and an image plane-side surface thereof have an inflexion point. With such shapes, it is possible to satisfactorily correct off-axis aberrations. In addition, with the above-described shapes of the fifth lens L5 and the sixth lens L6, it is possible to easily secure telecentric characteristic, the incident angle of a light beam emitted from the imaging lens to the image plane IM is restrained to an angle smaller than the chief ray angle that is set in advance for each imaging element as a range of an incident angle of a light beam that can be taken in a sensor.

The imaging lens of the embodiment satisfies the following conditional expressions (1) to (11):

$$-0.7 < f1/f2 < -0.3 \quad (1)$$

$$0.8 < f12/f < 1.5 \quad (2)$$

$$-0.3 < f/f4 < -0.01 \quad (3)$$

$$-20.0 < f34/f < -1.0 \quad (4)$$

$$0.05 < D23/L16 < 0.3 \quad (5)$$

$$45 < vd1 < 75 \quad (6)$$

$$45 < vd4 < 75 \quad (7)$$

$$45 < vd5 < 75 \quad (8)$$

$$45 < vd6 < 75 \quad (9)$$

$$20 < vd2 < 40 \quad (10)$$

$$20 < vd3 < 40 \quad (11)$$

In the above formulas,
f: Focal length of the whole lens system
f1: Focal length of the first lens L1
f2: Focal length of the second lens L2
f4: Focal length of the fourth lens L4
f12: Composite focal length of the first lens L1 and the second lens L2
f34: Composite focal length of the third lens L3 and the fourth lens L4
D23: Distance on the optical axis from the image plane-side surface of the second lens L2 to the object-side surface of the third lens L3
L16: Distance on the optical axis from the object-side surface of the first lens L1 to the image plane-side surface of the sixth lens L6
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5
vd6: Abbe's number of the sixth lens L6

Here, it is not necessary to satisfy all of the conditional expressions, and it is achievable to obtain an effect corresponding to the respective conditional expression when any single one of the conditional expressions is individually satisfied.

In the embodiment, lens surfaces of each lens are formed as aspheric surfaces. When the aspheric surfaces applied to the lens surfaces have an axis Z in a direction of the optical axis X, a height H in a direction perpendicular to the optical axis X, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces is expressed as follows:

$$Z = \frac{\frac{H^2}{R}}{1 + \sqrt{1 - (k+1)\frac{H^2}{R^2}}} |A_4 H^4| A_6 H^6| \quad \text{[Formula]}$$

$$A_8 H^8 |A_{10} H^{10}| A_{12} H^{12} |A_{14} H^{14}| A_{16} H^{16}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index, and vd represents an Abbe's number, respectively. Here, surface numbers i affixed with * (asterisk) means the surfaces are aspheric.

Numerical Data Example 1

| Basic data are shown below. f = 4.20 mm, Fno = 2.1, ω = 35.2° Unit: mm | | | | |
|---|---|---|---|---|
| Surface Data | | | | |
| Surface Number i | r | d | nd | vd |
| (Object) | ∞ | ∞ | | |
| 1* | 1.471 | 0.741 | 1.5350 | 56.1(=vd1) |
| 2* (Stop) | −41.542 | 0.023 | | |
| 3* | 7.688 | 0.274 | 1.6355 | 24.0(=vd2) |
| 4* | 2.282 | 0.569(=D23) | | |
| 5* | −9.015 | 0.336 | 1.6355 | 24.0(=vd3) |
| 6* | −10.214 | 0.056 | | |
| 7* | −7.358 | 0.369 | 1.5350 | 56.1(=vd4) |
| 8* | −14.505 | 0.045 | | |
| 9* | −6.877 | 0.407 | 1.5350 | 56.1(=vd5) |
| 10* | −5.636 | 0.088 | | |
| 11* | 1.899 | 0.771 | 1.5350 | 56.1(=vd6) |
| 12* | 1.509 | 0.200 | | |
| 13 | ∞ | 0.300 | 1.5168 | 64.2 |
| 14 (Image plane) | ∞ | 0.739 | | | f1 = 2.66 mm
f2 = −5.16 mm
f3 = −134.38 mm
f4 = −28.32 mm
f5 = 52.18 mm
f6 = −44.21 mm
f12 = 4.25 mm
f34 = −23.14 mm
L16 = 3.679 mm

Aspheric Surface Data

First Surface k = 0.000, $A_4$ = −5.471E−05, $A_6$ = 2.081E−03, $A_8$ = 1.807E−02, $A_{10}$ = −7.882E−02, $A_{12}$ = 9.308E−02, $A_{14}$ = −4.401E−02
Second Surface k = 0.000, $A_4$ = −4.050E−02, $A_6$ = 1.641E−01, $A_8$ = −2.787E−01, $A_{10}$ = 1.737E−01, $A_{12}$ = 1.680E−02, $A_{14}$ = −5.626E−02
Third Surface k = 0.000, $A_4$ = −8.966E−02, $A_6$ = 2.901E−01, $A_8$ = −5.618E−01, $A_{10}$ = 7.291E−01, $A_{12}$ = −5.072E−01, $A_{14}$ = 1.446E−01
Fourth Surface k = 0.000, $A_4$ = −2.732E−02, $A_6$ = 1.022E−01, $A_8$ = −1.233E−01, $A_{10}$ = 4.211E−01, $A_{12}$ = −5.788E−01, $A_{14}$ = 3.509E−01

-continued

Basic data are shown below.
f = 4.20 mm, Fno = 2.1, ω = 35.2°
Unit: mm

Fifth Surface k = 0.000, $A_4$ = −4.663E−02, $A_6$ = −3.118E−01, $A_8$ = 5.053E−01,
$A_{10}$ = −6.105E−01, $A_{12}$ = 5.949E−01, $A_{14}$ = −2.568E−01
Sixth Surface k = 0.000, $A_4$ = −4.837E−02, $A_6$ = −1.934E−01, $A_8$ = 2.493E−01,
$A_{10}$ = −7.491E−02
Seventh Surface k = 0.000, $A_4$ = −2.898E−01, $A_6$ = 5.505E−01, $A_8$ = −4.000E−01,
$A_{10}$ = 1.407E−01, $A_{12}$ = −2.086E−02
Eighth Surface k = 0.000, $A_4$ = −3.946E−01, $A_6$ = 7.716E−01, $A_8$ = −8.063E−01,
$A_{10}$ = 5.242E−01, $A_{12}$ = −2.067E−01, $A_{14}$ = 4.482E−02,
$A_{16}$ = −4.122E−03
Ninth Surface k = 0.000, $A_4$ = 3.005E−01, $A_6$ = −3.073E−01, $A_8$ = 1.090E−01,
$A_{10}$ = −1.396E−02, $A_{12}$ = 2.132E−03, $A_{14}$ = −1.119E−03,
$A_{16}$ = 1.661E−04
Tenth Surface k = 0.000, $A_4$ = 3.418E−01, $A_6$ = −2.946E−01, $A_8$ = 1.103E−01,
$A_{10}$ = −1.433E−02, $A_{12}$ = −4.780E−03, $A_{14}$ = 1.983E−03,
$A_{16}$ = −1.984E−04
Eleventh Surface k = −7.791E−01, $A_4$ = −2.718E−01, $A_6$ = 1.638E−01, $A_8$ = −6.543E−02,
$A_{10}$ = 1.101E−02, $A_{12}$ = 2.571E−04, $A_{14}$ = −2.639E−04,
$A_{16}$ = 1.996E−05
Twelfth Surface k = −6.551, $A_4$ = −8.910E−02, $A_6$ = 2.743E−02, $A_8$ = −4.841E−03,
$A_{10}$ = −1.927E−03, $A_{12}$ = 1.152E−03, $A_{14}$ = −2.096E−04,
$A_{16}$ = 1.322E−05

The values of the respective conditional expressions (1) to (5) are as follows:

$$f1/f2 = -0.52 \quad (1)$$

$$f12/f = 1.01 \quad (2)$$

$$f/f4 = -0.15 \quad (3)$$

$$f34/f = -5.51 \quad (4)$$

$$D23/L16 = 0.15 \quad (5)$$

Accordingly, the imaging lens of Numerical Data Example 1 satisfies the above-described conditional expressions. A distance on the optical axis X from the object-side surface of the first lens L1 to the image plane IM (length in air) is 4.82 mm, and downsizing of the imaging lens is attained.

Figure 2:
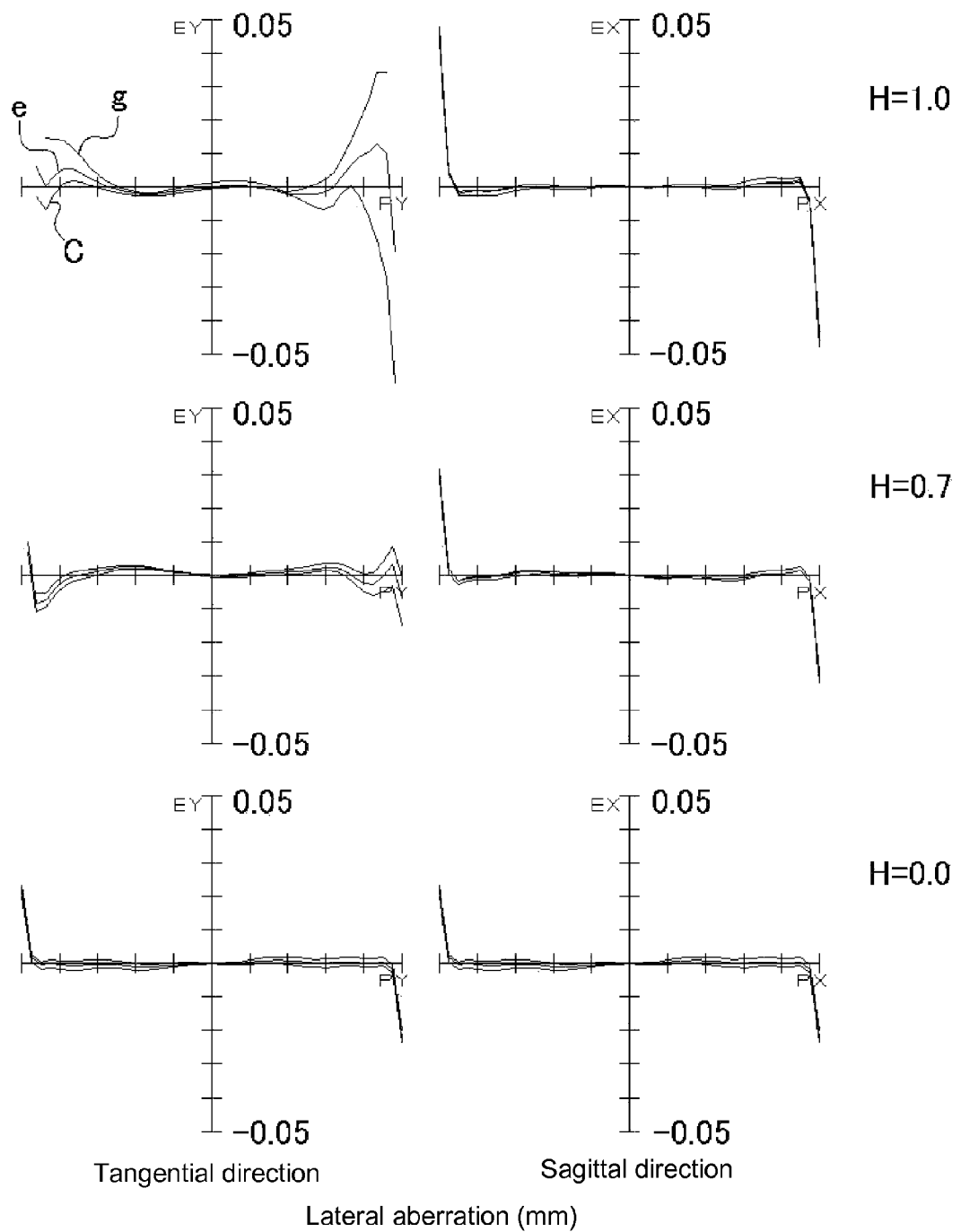
FIG. 2 is an aberration diagram showing a lateral aberration of the imaging lens of FIG. 1.
Figure 3:
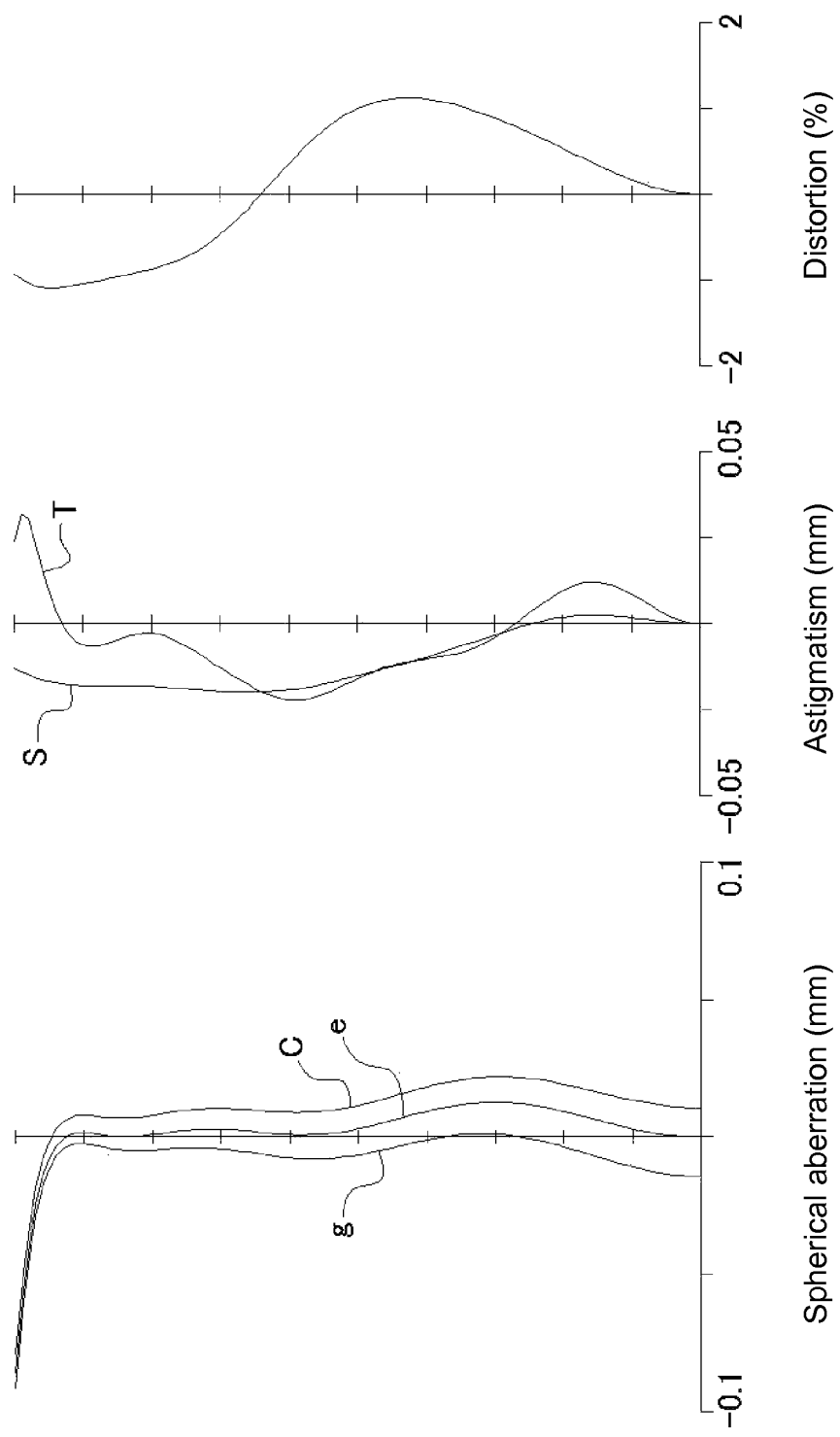
FIG. 3 is an aberration diagram showing a spherical aberration, astigmatism, and a distortion of the imaging lens of FIG. 1.
Figure 4:
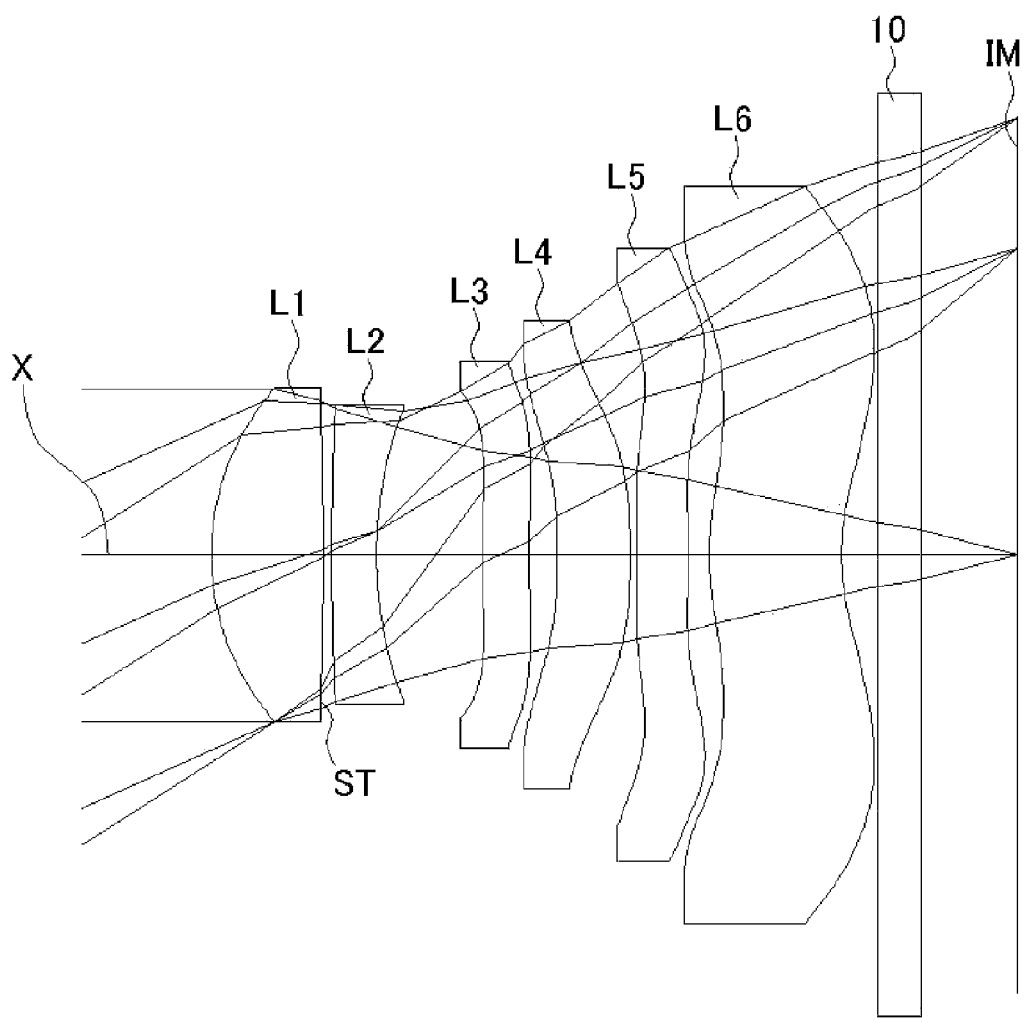
FIG. 4 shows a sectional view of a schematic configuration of an imaging lens in Numerical Data Example 2 according to the embodiment of the invention.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, 11, 14, and 17) in the imaging lens of Numerical Data Example 1. Furthermore, FIG. 3 shows a spherical aberration (mm), astigmatism (mm), and a distortion (%), respectively, in the imaging lens of Numerical Data Example 1. In the aberration diagrams, for the lateral aberration diagrams and spherical aberration diagrams, aberrations at each wavelength, i.e. a g line (435.84 nm), an e line (546.07 nm), and a C line (656.27 nm) are indicated. In astigmatism diagram, an aberration on a sagittal image surface S and an aberration on a tangential image surface T are respectively indicated (which are the same in FIGS. 6, 9, 12, 15, and 18). As shown in FIGS. 2 and 3, according to the imaging lens of Numerical Data Example 1, the aberrations are satisfactorily corrected.

Numerical Data Example 2

Basic data are shown below.
f = 4.61 mm, Fno = 2.0, ω = 32.7°
Unit: mm

Surface Data

| Surface Number i | r | d | nd | vd |
|---|---|---|---|---|
| (Object) | ∞ | ∞ | | |
| 1* | 1.713 | 0.761 | 1.5350 | 56.1 (=vd1) |
| 2* (Stop) | 70.172 | 0.058 | | |
| 3* | 7.625 | 0.309 | 1.6355 | 24.0 (=vd2) |
| 4* | 2.638 | 0.723 (=D23) | | |
| 5* | 8.695 | 0.317 | 1.6355 | 24.0 (=vd3) |
| 6* | 6.886 | 0.189 | | |
| 7* | −14.611 | 0.498 | 1.5350 | 56.1 (=vd4) |
| 8* | −20.256 | 0.052 | | |
| 9* | −6.014 | 0.348 | 1.5350 | 56.1 (=vd5) |
| 10* | −5.126 | 0.141 | | |
| 11* | 1.836 | 0.901 | 1.5350 | 56.1 (=vd6) |
| 12* | 1.469 | 0.250 | | |
| 13 | ∞ | 0.300 | 1.5168 | 64.2 |
| 14 | ∞ | 0.653 | | |
| (Image plane) | ∞ | | | | f1 = 3.26 mm
f2 = −6.44 mm
f3 = −55.39 mm
f4 = −100.76 mm
f5 = 56.82 mm
f6 = −95.74 mm
f12 = 5.19 mm
f34 = −36.08 mm
L16 = 4.297 mm

Aspheric Surface Data

First Surface k = 0.000, $A_4$ = 7.737E−03, $A_6$ = −2.527E−02, $A_8$ = 5.628E−02,
$A_{10}$ = −6.839E−02, $A_{12}$ = 4.299E−02, $A_{14}$ = −1.158E−02
Second Surface k = 0.000, $A_4$ = −1.023E−01, $A_6$ = 2.115E−01, $A_8$ = −2.394E−01,
$A_{10}$ = 1.602E−01, $A_{12}$ = −6.154E−02, $A_{14}$ = 9.655E−03
Third Surface k = 0.000, $A_4$ = −1.635E−01, $A_6$ = 2.984E−01, $A_8$ = −3.331E−01,
$A_{10}$ = 2.420E−01, $A_{12}$ = −1.058E−01, $A_{14}$ = 2.218E−02
Fourth Surface k = 0.000, $A_4$ = −7.844E−02, $A_6$ = 1.435E−01, $A_8$ = −1.608E−01,
$A_{10}$ = 1.551E−01, $A_{12}$ = −9.688E−02, $A_{14}$ = 3.168E−02
Fifth Surface k = 0.000, $A_4$ = −9.312E−02, $A_6$ = −1.363E−02, $A_8$ = 5.838E−02,
$A_{10}$ = −2.007E−01, $A_{12}$ = 1.697E−01, $A_{14}$ = −4.926E−02
Sixth Surface k = 0.000, $A_4$ = −1.823E−01, $A_6$ = 1.779E−01, $A_8$ = −1.456E−01,
$A_{10}$ = 4.276E−02
Seventh Surface k = 0.000, $A_4$ = −4.409E−01, $A_6$ = 5.705E−01, $A_8$ = −3.472E−01,
$A_{10}$ = 1.071E−01, $A_{12}$ = −1.299E−02

Basic data are shown below.
f = 4.61 mm, Fno = 2.0, ω = 32.7°
Unit: mm

Eighth Surface k = 0.000, $A_4$ = −4.680E−01, $A_6$ = 6.624E−01, $A_8$ = −6.818E−01,
$A_{10}$ = 4.797E−01, $A_{12}$ = −2.026E−01, $A_{14}$ = 4.589E−02,
$A_{16}$ = −4.276E−03
Ninth Surface k = 0.000, $A_4$ = 3.261E−01, $A_6$ = −2.920E−01, $A_8$ = 1.097E−01,
$A_{10}$ = −1.424E−02, $A_{12}$ = −4.195E−03, $A_{14}$ = 1.887E−03,
$A_{16}$ = −2.101E−04
Tenth Surface k = 0.000, $A_4$ = 3.433E−01, $A_6$ = −2.584E−01, $A_8$ = 8.531E−02,
$A_{10}$ = −6.981E−03, $A_{12}$ = −4.528E−03, $A_{14}$ = 1.434E−03,
$A_{16}$ = −1.260E−04
Eleventh Surface k = −8.377E−01, $A_4$ = −2.882E−01, $A_6$ = 1.513E−01, $A_8$ = −4.549E−02,
$A_{10}$ = 5.229E−03, $A_{12}$ = 1.543E−04, $A_{14}$ = −2.335E−05,
$A_{16}$ = −4.869E−06
Twelfth Surface k = −6.143, $A_4$ = −6.398E−02, $A_6$ = 9.073E−03, $A_8$ = 4.646E−03,
$A_{10}$ = −3.459E−03, $A_{12}$ = 9.031E−04, $A_{14}$ = −1.084E−04,
$A_{16}$ = 5.005E−06

The values of the respective conditional expressions are as follows:

$f1/f2 = -0.51$ $f12/f = 1.13$ $f/f4 = -0.046$ $f34/f = -7.83$ $D23/L16 = 0.17$

Accordingly, the imaging lens of Numerical Data Example 2 satisfies the above-described conditional expressions. A distance on the optical axis X from the object-side surface of the first lens L1 to the image plane IM (length in air) is 5.40 mm, and downsizing of the imaging lens is attained.

Figure 5:
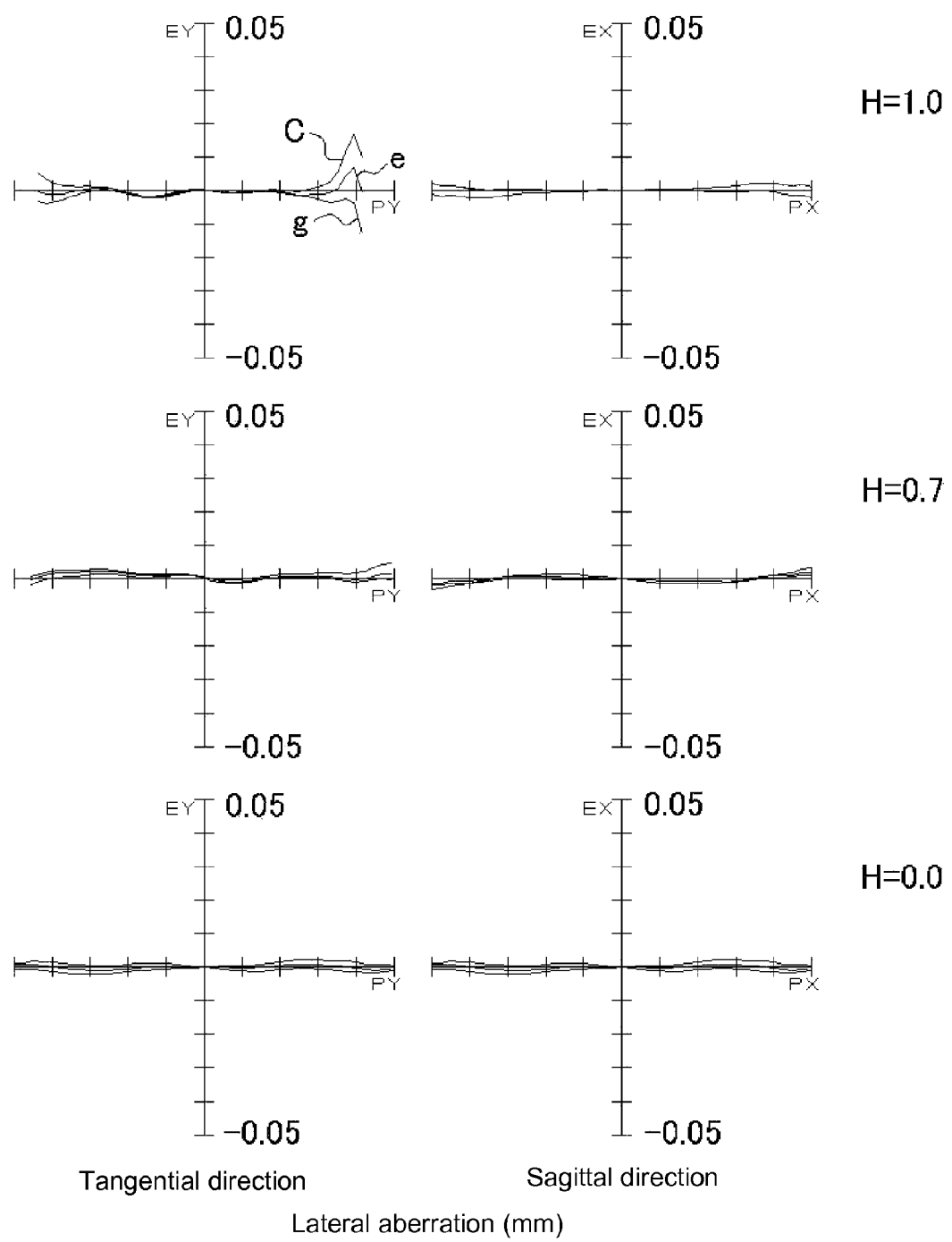
FIG. 5 is an aberration diagram showing a lateral aberration of the imaging lens of FIG. 4.
Figure 6:
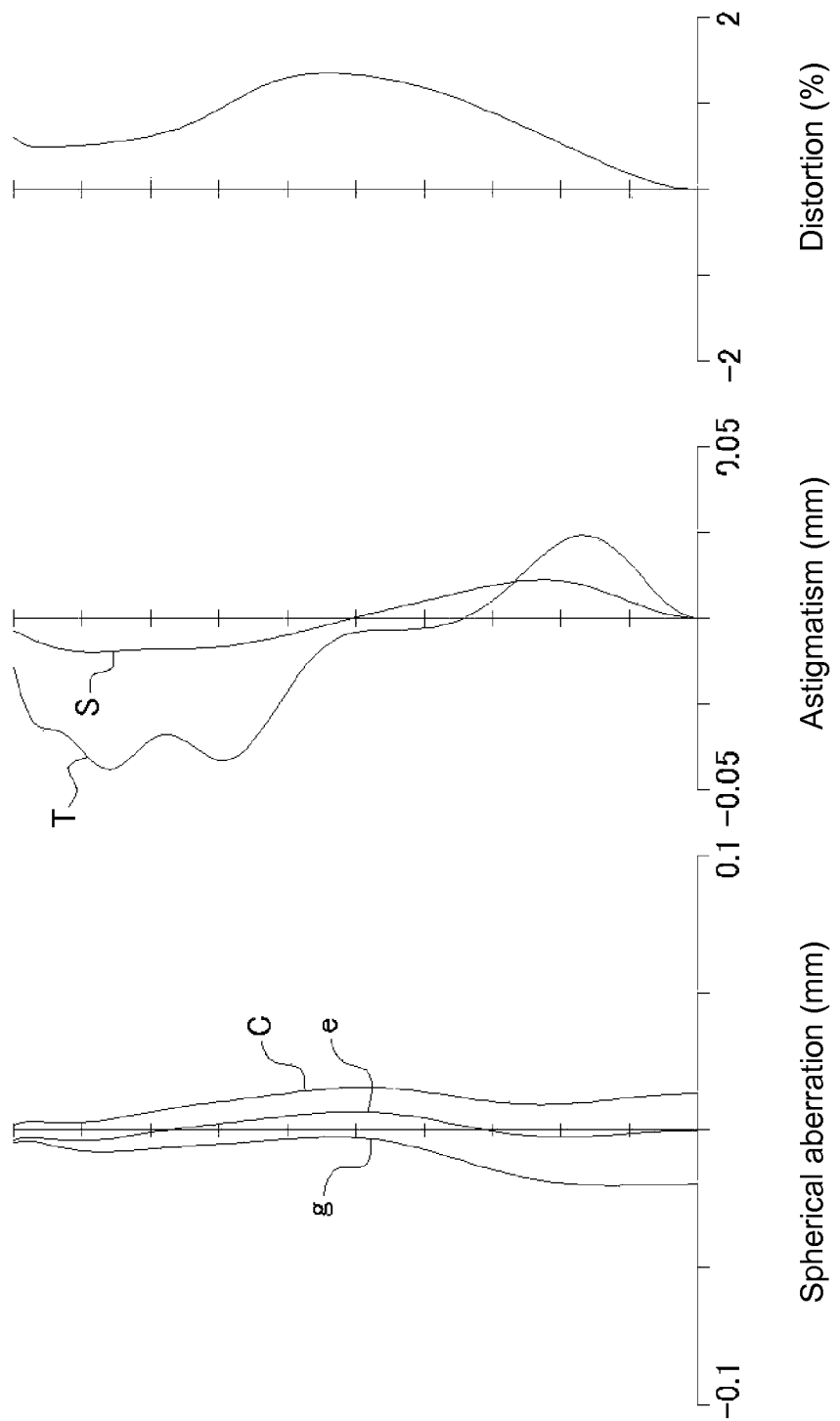
FIG. 6 is an aberration diagram showing a spherical aberration, astigmatism, and a distortion of the imaging lens of FIG. 4.
Figure 7:
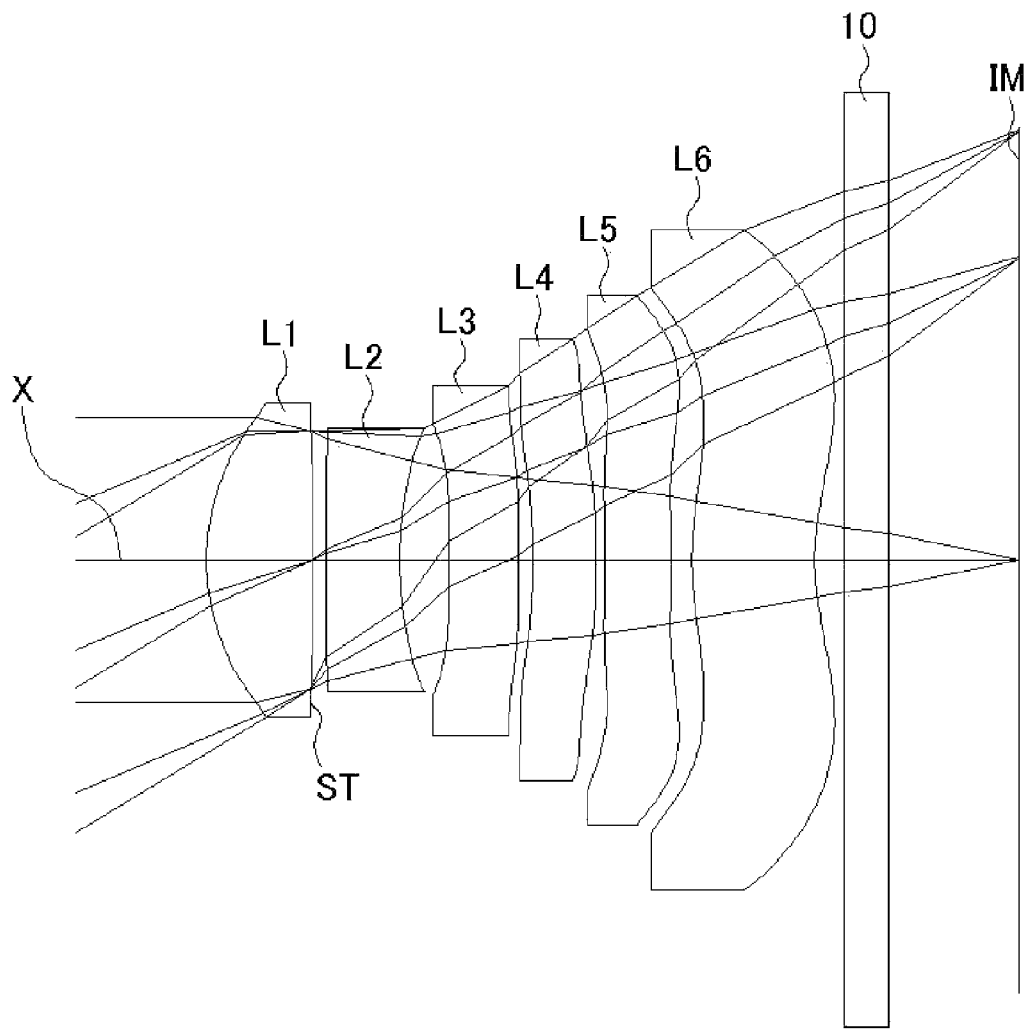
FIG. 7 shows a sectional view of a schematic configuration of an imaging lens in Numerical Data Example 3 according to the embodiment of the invention.

FIG. 5 shows the lateral aberration that corresponds to the image height ratio H of the imaging lens in Numerical Data Example 2, and FIG. 6 shows the spherical aberration (mm), the astigmatism (mm), and the distortion (%), respectively. As shown in FIGS. 5 and 6, according to the imaging lens of Numerical Data Example 2, the aberrations are also satisfactorily corrected.

Numerical Data Example 3

Basic data are shown below.
f = 4.87 mm, Fno = 2.3, ω = 31.3°
Unit: mm

Surface Data

| Surface Number i | r | d | nd | vd |
|---|---|---|---|---|
| (Object) | ∞ | ∞ | | |
| 1* | 1.538 | 0.715 | 1.5350 | 56.1 (=vd1) |
| 2* (Stop) | −38921.490 | 0.087 | | |
| 3* | 16.514 | 0.500 | 1.6355 | 24.0 (=vd2) |
| 4* | 2.623 | 0.333 (=D23) | | |
| 5* | −28.730 | 0.467 | 1.6355 | 24.0 (=vd3) |
| 6* | −30.158 | 0.095 | | |
| 7* | −8.472 | 0.426 | 1.5350 | 56.1 (=vd4) |
| 8* | −20.497 | 0.064 | | |
| 9* | −5.263 | 0.448 | 1.5350 | 56.1 (=vd5) |
| 10* | −4.946 | 0.136 | | |
| 11* | 2.131 | 0.826 | 1.5350 | 56.1 (=vd6) |
| 12* | 1.617 | 0.200 | | |
| 13 | ∞ | 0.300 | 1.5168 | 64.2 |
| 14 | ∞ | 0.877 | | |
| (Image plane) | ∞ | | | | f1 = 2.86 mm
f2 = −4.93 mm
f3 = −1084.51 mm
f4 = −27.23 mm
f5 = 102.36 mm
f6 = −28.41 mm
f12 = 4.73 mm
f34 = −26.40 mm
L16 = 4.097 mm

Aspheric Surface Data

First Surface k = 0.000, $A_4$ = −1.799E−03, $A_6$ = 1.203E−03, $A_8$ = 2.196E−02,
$A_{10}$ = −7.820E−02, $A_{12}$ = 9.229E−02, $A_{14}$ = −4.398E−02
Second Surface k = 0.000, $A_4$ = −5.353E−02, $A_6$ = 1.626E−01, $A_8$ = −2.759E−01,
$A_{10}$ = 1.744E−01, $A_{12}$ = 1.473E−02, $A_{14}$ = −5.807E−02
Third Surface k = 0.000, $A_4$ = −8.293E−02, $A_6$ = 2.664E−01, $A_8$ = −5.712E−01,
$A_{10}$ = 7.369E−01, $A_{12}$ = −5.001E−01, $A_{14}$ = 1.309E−01
Fourth Surface k = 0.000, $A_4$ = −3.985E−02, $A_6$ = 7.526E−02, $A_8$ = −1.382E−01,
$A_{10}$ = 4.364E−01, $A_{12}$ = −5.632E−01, $A_{14}$ = 3.057E−01
Fifth Surface k = 0.000, $A_4$ = −5.491E−02, $A_6$ = −3.272E−01, $A_8$ = 5.358E−01,
$A_{10}$ = −6.029E−01, $A_{12}$ = 5.711E−01, $A_{14}$ = −2.637E−01
Sixth Surface k = 0.000, $A_4$ = −3.175E−02, $A_6$ = −1.750E−01, $A_8$ = 2.452E−01,
$A_{10}$ = −8.143E−02
Seventh Surface k = 0.000, $A_4$ = −2.941E−01, $A_6$ = 5.535E−01, $A_8$ = −3.953E−01,
$A_{10}$ = 1.407E−01, $A_{12}$ = −2.327E−02
Eighth Surface k = 0.000, $A_4$ = −3.866E−01, $A_6$ = 7.724E−01, $A_8$ = −8.079E−01,
$A_{10}$ = 5.238E−01, $A_{12}$ = −2.068E−01, $A_{14}$ = 4.483E−02,
$A_{16}$ = −4.127E−03
Ninth Surface k = 0.000, $A_4$ = 3.202E−01, $A_6$ = −3.079E−01, $A_8$ = 1.081E−01,
$A_{10}$ = −1.418E−02, $A_{12}$ = 2.097E−03, $A_{14}$ = −1.120E−03,
$A_{16}$ = 1.659E−04
Tenth Surface k = 0.000, $A_4$ = 3.433E−01, $A_6$ = −2.946E−01, $A_8$ = 1.101E−01,
$A_{10}$ = −1.434E−02, $A_{12}$ = −4.774E−03, $A_{14}$ = 1.985E−03,
$A_{16}$ = −1.986E−04
Eleventh Surface k = −7.303E−01, $A_4$ = −2.668E−01, $A_6$ = 1.616E−01, $A_8$ = −6.573E−02,
$A_{10}$ = 1.100E−02, $A_{12}$ = 2.638E−04, $A_{14}$ = −2.619E−04,
$A_{16}$ = 2.065E−05

Basic data are shown below.
f = 4.87 mm, Fno = 2.3, ω = 31.3°
Unit: mm

Twelfth Surface k = −8.772, $A_4$ = −9.632E−02, $A_6$ = 2.910E−02, $A_8$ = −4.805E−03, $A_{10}$ = −1.950E−03, $A_{12}$ = 1.149E−03, $A_{14}$ = −2.097E−04, $A_{16}$ = 1.332E−05

The values of the respective conditional expressions are as follows:

$f1/f2$=−0.58

$f12/f$=0.97

$f/f4$=−0.18

$f34/f$=−5.42

$D23/L16$=0.081

Accordingly, the imaging lens of Numerical Data Example 3 satisfies the above-described conditional expressions. A distance on the optical axis from the object-side surface of the first lens L1 to the image plane IM (length in air) is 5.37 mm, and downsizing of the imaging lens is attained.

Figure 8:
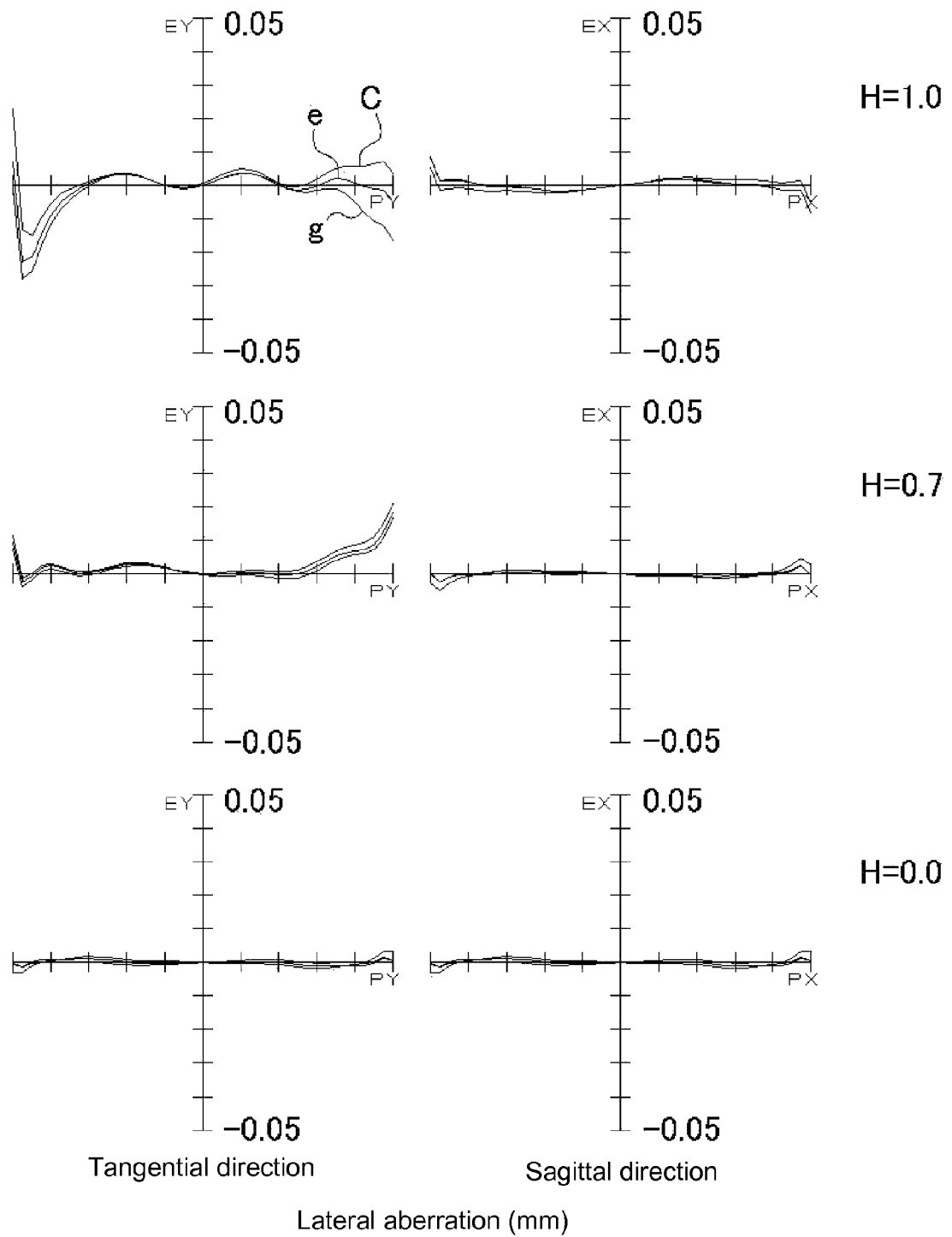
FIG. 8 is an aberration diagram showing a lateral aberration of the imaging lens of FIG. 7.
Figure 9:
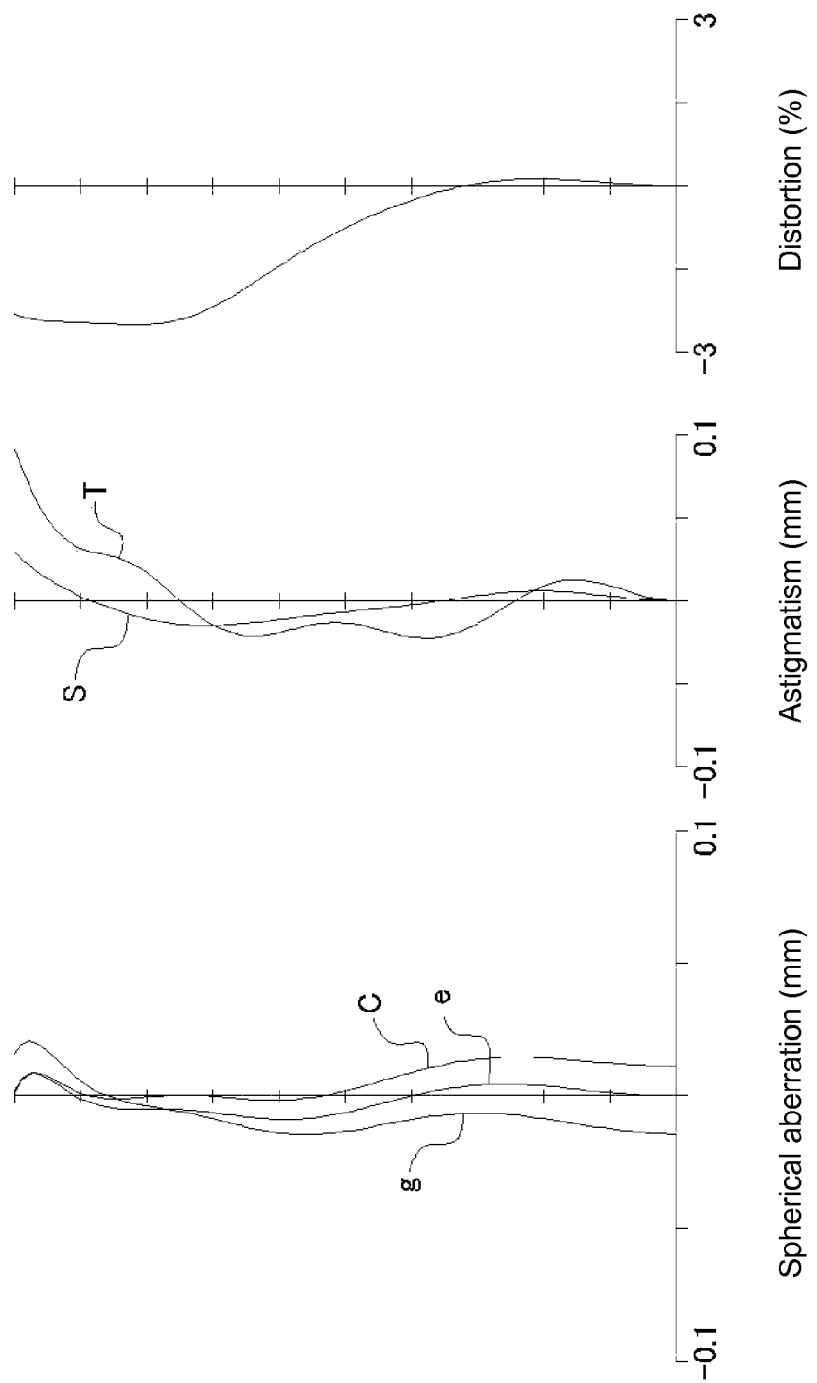
FIG. 9 is an aberration diagram showing a spherical aberration, astigmatism, and a distortion of the imaging lens of FIG. 7.
Figure 10:
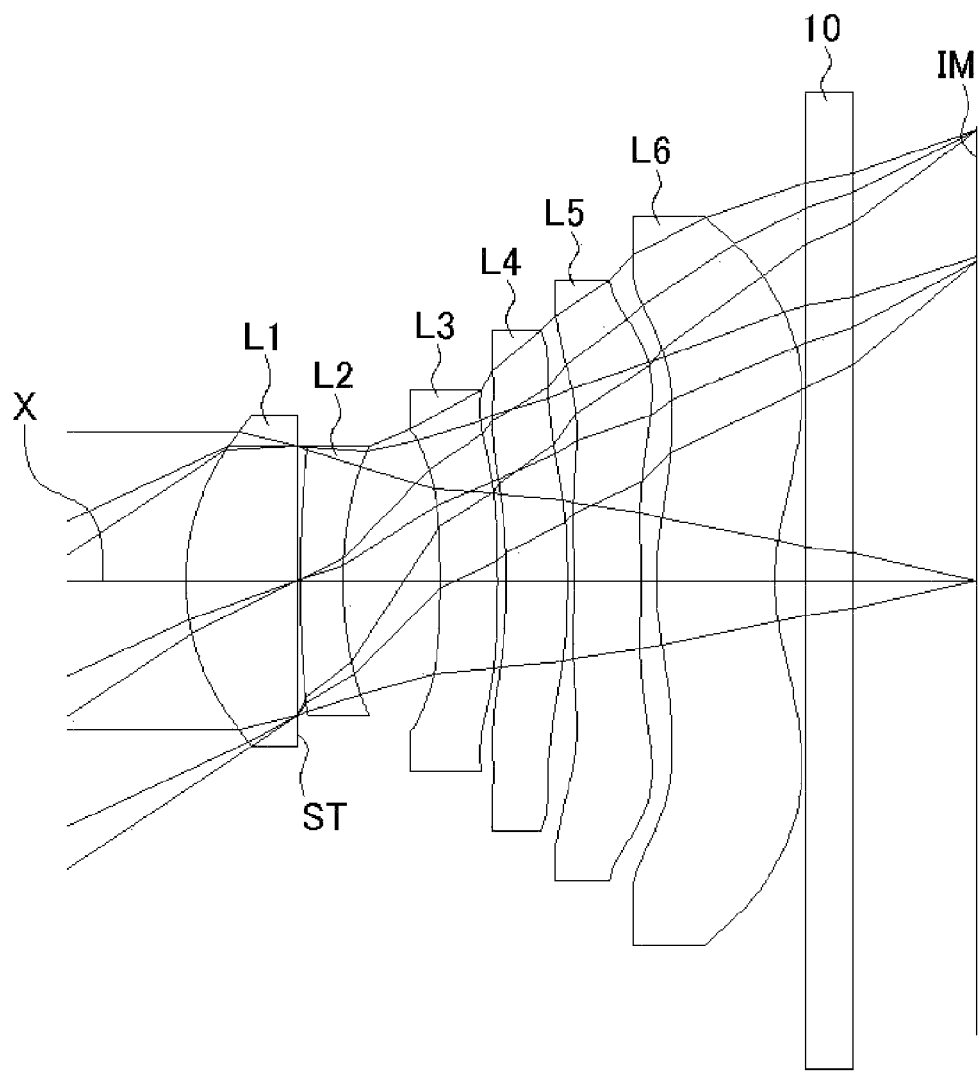
FIG. 10 shows a sectional view of a schematic configuration of an imaging lens in Numerical Data Example 4 according to the embodiment of the invention.

FIG. 8 shows the lateral aberration that corresponds to the image height ratio H of the imaging lens in Numerical Data Example 3 and FIG. 9 shows the spherical aberration (mm), the astigmatism (mm), and the distortion (%), respectively. As shown in FIGS. 8 and 9, according to the imaging lens of Numerical Data Example 3, the aberrations are satisfactorily corrected.

Numerical Data Example 4

Basic data are shown below.
f = 4.45 mm, Fno = 2.1, ω = 33.7°
Unit: mm

Surface Data

| Surface Number i | r | d | nd | vd |
|---|---|---|---|---|
| (Object) | ∞ | ∞ | | |
| 1* | 1.505 | 0.722 | 1.5350 | 56.1 (=vd1) |
| 2* (Stop) | 8.5933 | 0.014 | | |
| 3* | 6.527 | 0.279 | 1.6355 | 24.0 (=vd2) |
| 4* | 2.536 | 0.626 (=D23) | | |
| 5* | −6.929 | 0.367 | 1.6355 | 24.0 (=vd3) |
| 6* | −10.813 | 0.058 | | |
| 7* | −6.966 | 0.392 | 1.5350 | 56.1 (=vd4) |
| 8* | −14.138 | 0.047 | | |
| 9* | −6.770 | 0.433 | 1.5350 | 56.1 (=vd5) |
| 10* | −5.674 | 0.095 | | |
| 11* | 1.903 | 0.768 | 1.5350 | 56.1 (=vd6) |
| 12* | 1.497 | 0.200 | | |
| 13 | ∞ | 0.300 | 1.5168 | 64.2 |
| 14 | ∞ | 0.802 | | |
| (Image plane) | ∞ | | | | f1 = 2.84 mm
f2 = −6.65 mm
f3 = −31.21 mm
f4 = −26.07 mm
f5 = 57.39 mm
f6 = −38.73 mm

Basic data are shown below.
f = 4.45 mm, Fno = 2.1, ω = 33.7°
Unit: mm f12 = 4.13 mm
f34 = −14.09 mm
L16 = 3.801 mm Aspheric Surface Data First Surface k = 0.000, $A_4$ = −1.949E−04, $A_6$ = 1.546E−03, $A_8$ = 1.964E−02, $A_{10}$ = −7.897E−02, $A_{12}$ = 9.275E−02, $A_{14}$ = −4.388E−02
Second Surface k = 0.000, $A_4$ = −4.512E−02, $A_6$ = 1.625E−01, $A_8$ = −2.798E−01, $A_{10}$ = 1.724E−0.1, $A_{12}$ = 1.562E−02, $A_{14}$ = −5.478E−02
Third Surface k = 0.000, $A_4$ = −9.001E−02, $A_6$ = 2.840E−01, $A_8$ = −5.679E−01, $A_{10}$ = 7.287E−01, $A_{12}$ = −5.035E−01, $A_{14}$ = 1.445E−01
Fourth Surface k = 0.000, $A_4$ = −3.045E−02, $A_6$ = 8.348E−02, $A_8$ = −1.307E−01, $A_{10}$ = 4.219E−01, $A_{12}$ = −5.812E−01, $A_{14}$ = 3.320E−01
Fifth Surface k = 0.000, $A_4$ = −4.414E−02, $A_6$ = −3.260E−01, $A_8$ = 5.082E−01, $A_{10}$ = −5.958E−01, $A_{12}$ = 5.999E−01, $A_{14}$ = −2.767E−01
Sixth Surface k = 0.000, $A_4$ = −4.248E−02, $A_6$ = −1.897E−01, $A_8$ = 2.506E−01, $A_{10}$ = −7.447E−02
Seventh Surface k = 0.000, $A_4$ = −2.880E−01, $A_6$ = 5.524E−01, $A_8$ = −3.988E−01, $A_{10}$ = 1.408E−01, $A_{12}$ = −2.117E−02
Eighth Surface k = 0.000, $A_4$ = −3.910E−01, $A_6$ = 7.722E−01, $A_8$ = −8.061E−01, $A_{10}$ = 5.243E−01, $A_{12}$ = −2.067E−01, $A_{14}$ = 4.482E−02, $A_{16}$ = −4.122E−03
Ninth Surface k = 0.000, $A_4$ = 3.024E−01, $A_6$ = −3.066E−01, $A_8$ = 1.091E−01, $A_{10}$ = −1.393E−02, $A_{12}$ = 2.138E−03, $A_{14}$ = −1.118E−03, $A_{16}$ = 1.655E−04
Tenth Surface k = 0.000, $A_4$ = 3.436E−01, $A_6$ = −2.943E−01, $A_8$ = 1.103E−01, $A_{10}$ = −1.433E−02, $A_{12}$ = −4.781E−03, $A_{14}$ = 1.983E−03, $A_{16}$ = −1.985E−04
Eleventh Surface k = −7.525E−01, $A_4$ = −2.710E−01, $A_6$ = 1.639E−01, $A_8$ = −6.542E−02, $A_{10}$ = 1.101E−02, $A_{12}$ = 2.568E−04, $A_{14}$ = −2.641E−04, $A_{16}$ = 1.990E−05
Twelfth Surface k = −7.073, $A_4$ = −8.897E−02, $A_6$ = 2.764E−02, $A_8$ = −4.789E−03, $A_{10}$ = −1.922E−03, $A_{12}$ = 1.152E−03, $A_{14}$ = −2.098E−04, $A_{16}$ = 1.317E−05

The values of the respective conditional expressions are as follows:

$f1/f2$=−0.43

$f12/f$=0.93

$f/f4$=−0.17

$f34/f$=−3.17

$D23/L16$=0.16

Accordingly, the imaging lens of Numerical Data Example 4 satisfies the above-described conditional expressions. A distance on the optical axis X from the object-side surface of the first lens L1 to the image plane IM (length in air) is 5.00 mm, and downsizing of the imaging lens is attained.

Figure 11:
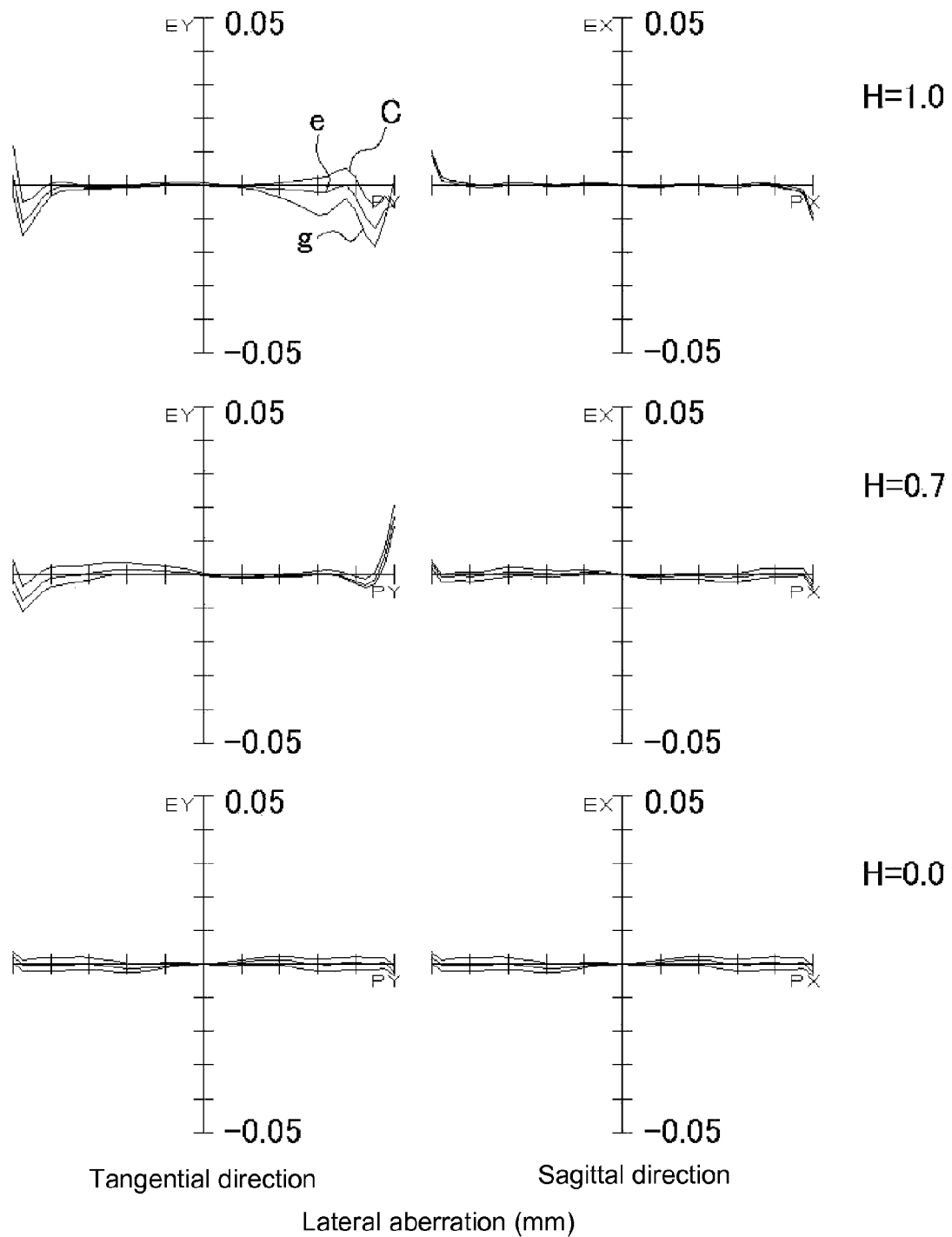
FIG. 11 is an aberration diagram showing a lateral aberration of the imaging lens of FIG. 10.
Figure 12:
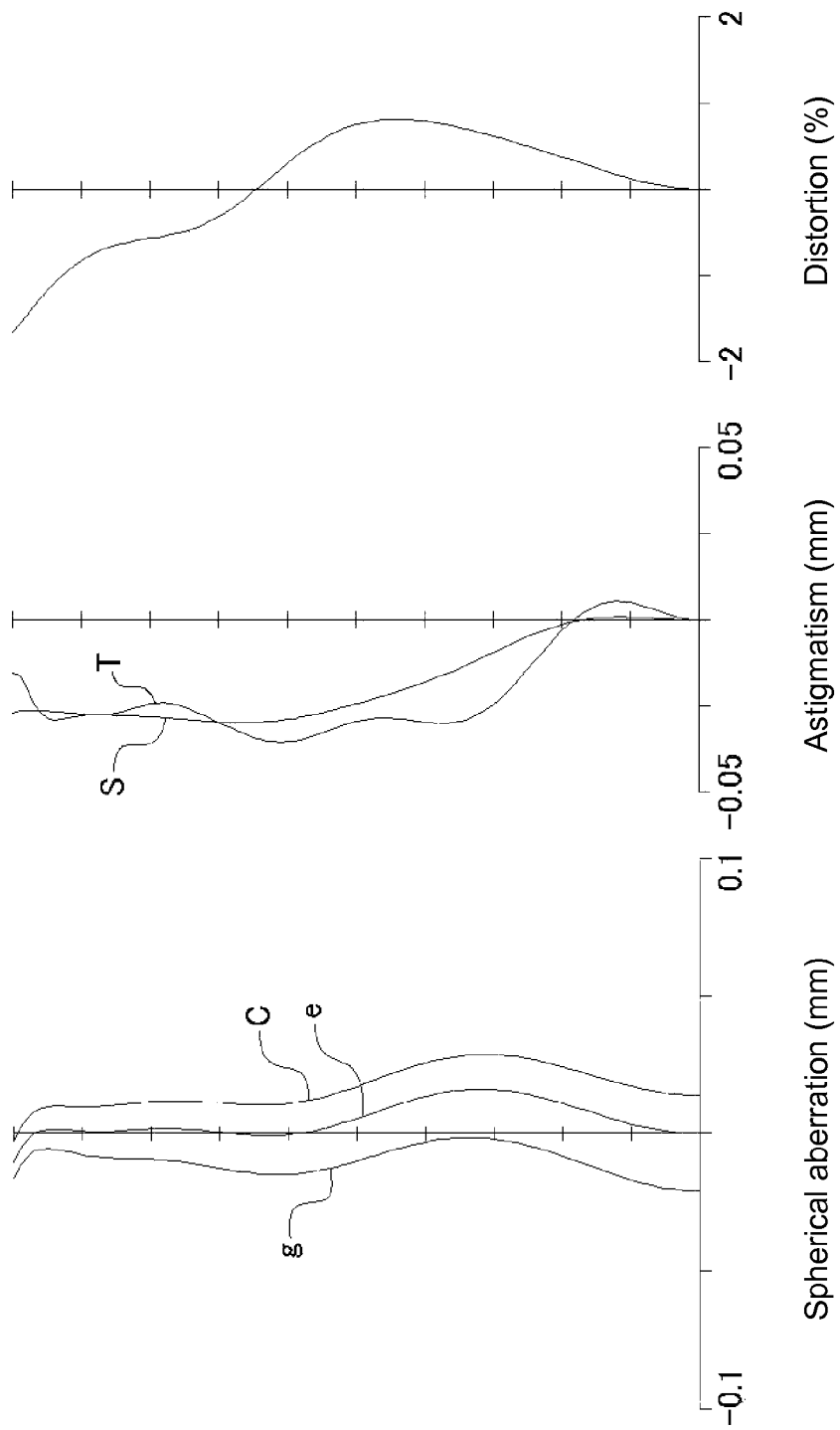
FIG. 12 is an aberration diagram showing a spherical aberration, astigmatism, and a distortion of the imaging lens of FIG. 10.
Figure 13:
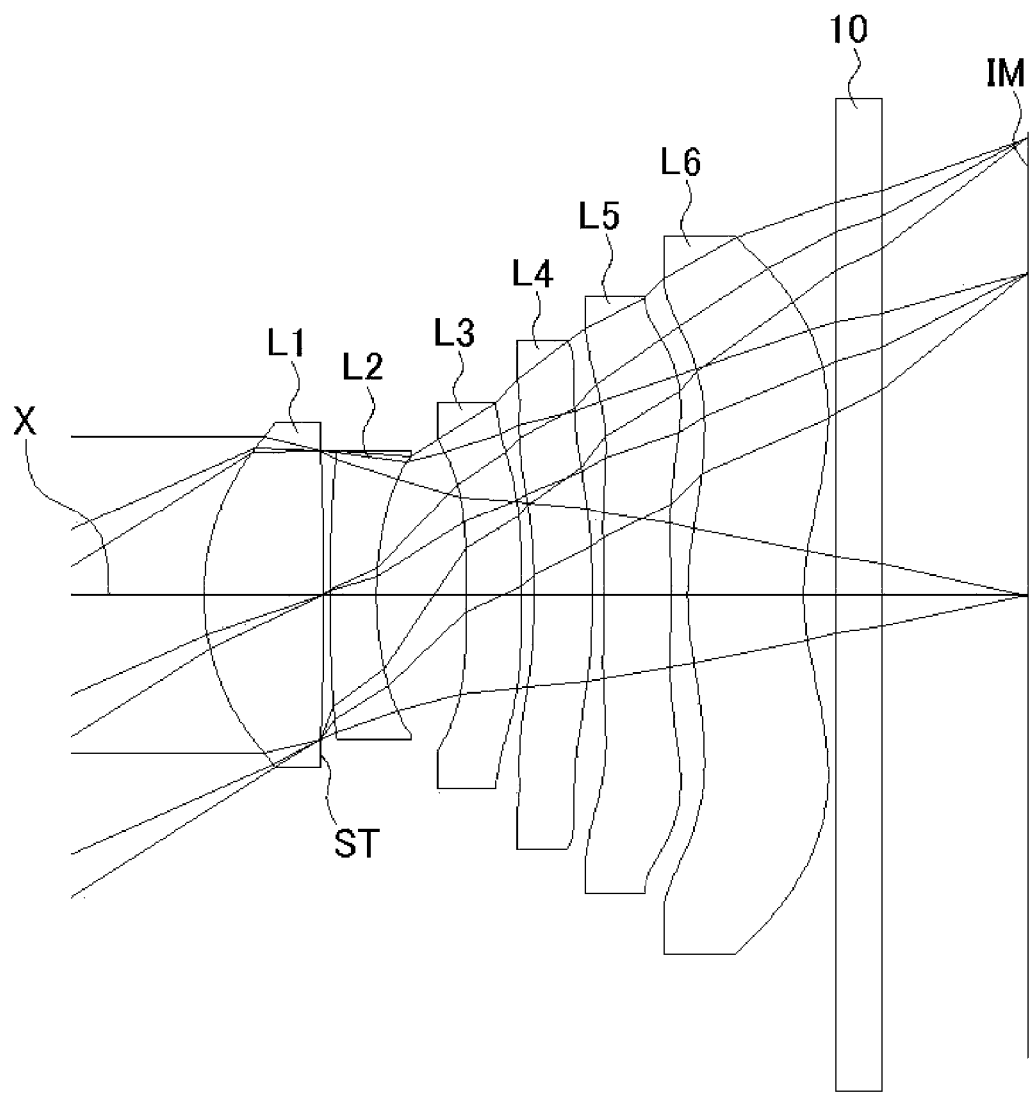
FIG. 13 shows a sectional view of a schematic configuration of an imaging lens in Numerical Data Example 5 according to the embodiment of the invention.

FIG. 11 shows the lateral aberration that corresponds to the image height ratio H of the imaging lens in Numerical Data Example 4 and FIG. 12 shows the spherical aberration (mm), the astigmatism (mm), and the distortion (%), respectively. As shown in FIGS. 11 and 12, according to the imaging lens of Numerical Data Example 4, the aberrations are also satisfactorily corrected.

Numerical Data Example 5

Basic data are shown below.
f = 4.68 mm, Fno = 2.1, ω = 32.4°
Unit: mm

Surface Data

| Surface Number i | r | d | nd | vd |
|---|---|---|---|---|
| (Object) | ∞ | ∞ | | |
| 1* | 1.486 | 0.756 | 1.5350 | 56.1 (=vd1) |
| 2* (Stop) | −32.618 | 0.041 | | |
| 3* | 8.951 | 0.294 | 1.6355 | 24.0 (=vd2) |
| 4* | 2.197 | 0.575 (=D23) | | |
| 5* | −9.338 | 0.348 | 1.6355 | 24.0 (=vd3) |
| 6* | −9.847 | 0.078 | | |
| 7* | −6.818 | 0.367 | 1.5350 | 56.1 (=vd4) |
| 8* | −16.170 | 0.076 | | |
| 9* | −6.032 | 0.428 | 1.5350 | 56.1 (=vd5) |
| 10* | −5.370 | 0.104 | | |
| 11* | 1.884 | 0.736 | 1.5350 | 56.1 (=vd6) |
| 12* | 1.525 | 0.200 | | |
| 13 | ∞ | 0.300 | 1.5168 | 64.2 |
| 14 (Image plane) | ∞ | 0.925 | | | f1 = 2.67 mm
f2 = −4.61 mm
f3 = −384.29 mm
f4 = −22.26 mm
f5 = 74.34 mm
f6 = −52.48 mm
f12 = 4.55 mm
f34 = −20.76 mm
L16 = 3.803 mm

Aspheric Surface Data

First Surface k = 0.000, $A_4$ = −3.926E−04, $A_6$ = 1.761E−03, $A_8$ = 1.759E−02, $A_{10}$ = −7.882E−02, $A_{12}$ = 9.346E−02, $A_{14}$ = −4.285E−02
Second Surface k = 0.000, $A_4$ = −4.072E−02, $A_6$ = 1.634E−01, $A_8$ = −2.799E−01, $A_{10}$ = 1.738E−01, $A_{12}$ = 1.781E−02, $A_{14}$ = −5.303E−02
Third Surface k = 0.000, $A_4$ = −8.769E−02, $A_6$ = 2.872E−01, $A_8$ = −5.686E−01, $A_{10}$ = 7.325E−01, $A_{12}$ = −4.958E−01, $A_{14}$ = 1.353E−01
Fourth Surface k = 0.000, $A_4$ = −2.949E−02, $A_6$ = 1.028E−01, $A_8$ = −1.293E−01, $A_{10}$ = 4.297E−01, $A_{12}$ = −5.767E−01, $A_{14}$ = 3.418E−01
Fifth Surface k = 0.000, $A_4$ = −5.508E−02, $A_6$ = −3.087E−01, $A_8$ = 5.051E−01, $A_{10}$ = −6.231E−01, $A_{12}$ = 5.923E−01, $A_{14}$ = −2.434E−01

-continued

Basic data are shown below.
f = 4.68 mm, Fno = 2.1, ω = 32.4°
Unit: mm

Sixth Surface k = 0.000, $A_4$ = −5.170E−02, $A_6$ = −1.961E−01, $A_8$ = 2.489E−01, $A_{10}$ = −7.531E−02
Seventh Surface k = 0.000, $A_4$ = −2.953E−01, $A_6$ = 5.553E−01, $A_8$ = −3.984E−01, $A_{10}$ = 1.407E−01, $A_{12}$ = −2.136E−02
Eighth Surface k = 0.000, $A_4$ = −3.880E−01, $A_6$ = 7.712E−01, $A_8$ = −8.064E−01, $A_{10}$ = 5.244E−01, $A_{12}$ = −2.066E−01, $A_{14}$ = 4.483E−02, $A_{16}$ = −4.135E−03
Ninth Surface k = 0.000, $A_4$ = 3.045E−01, $A_6$ = −3.067E−01, $A_8$ = 1.090E−01, $A_{10}$ = −1.395E−02, $A_{12}$ = 2.151E−03, $A_{14}$ = −1.120E−03, $A_{16}$ = 1.690E−04
Tenth Surface k = 0.000, $A_4$ = 3.420E−01, $A_6$ = −2.942E−01, $A_8$ = 1.104E−01, $A_{10}$ = −1.430E−02, $A_{12}$ = −4.774E−03, $A_{14}$ = 1.985E−03, $A_{16}$ = −1.980E−04
Eleventh Surface k = −8.085E−01, $A_4$ = −2.714.E−01, $A_6$ = 1.639E−01, $A_8$ = −6.540E−02, $A_{10}$ = 1.102E−02, $A_{12}$ = 2.602E−04, $A_{14}$ = −2.643E−04, $A_{16}$ = 1.987E−05
Twelfth Surface k = −7.858, $A_4$ = −9.353E−02, $A_6$ = 2.853E−02, $A_8$ = −4.858E−03, $A_{10}$ = −1.930E−03, $A_{12}$ = 1.151E−03, $A_{14}$ = −2.094E−04, $A_{16}$ = 1.323E−05

The values of the respective conditional expressions are as follows:

$f1/f2 = -0.58$ $f12/f = 0.97$ $f/f4 = -0.21$ $f34/f = -4.44$ $D23/L16 = 0.15$

Accordingly, the imaging lens of Numerical Data Example 5 satisfies the above-described conditional expressions. A distance on the optical axis X from the object-side surface of the first lens L1 to the image plane IM (length in air) is 5.13 mm, and downsizing of the imaging lens is attained.

Figure 14:
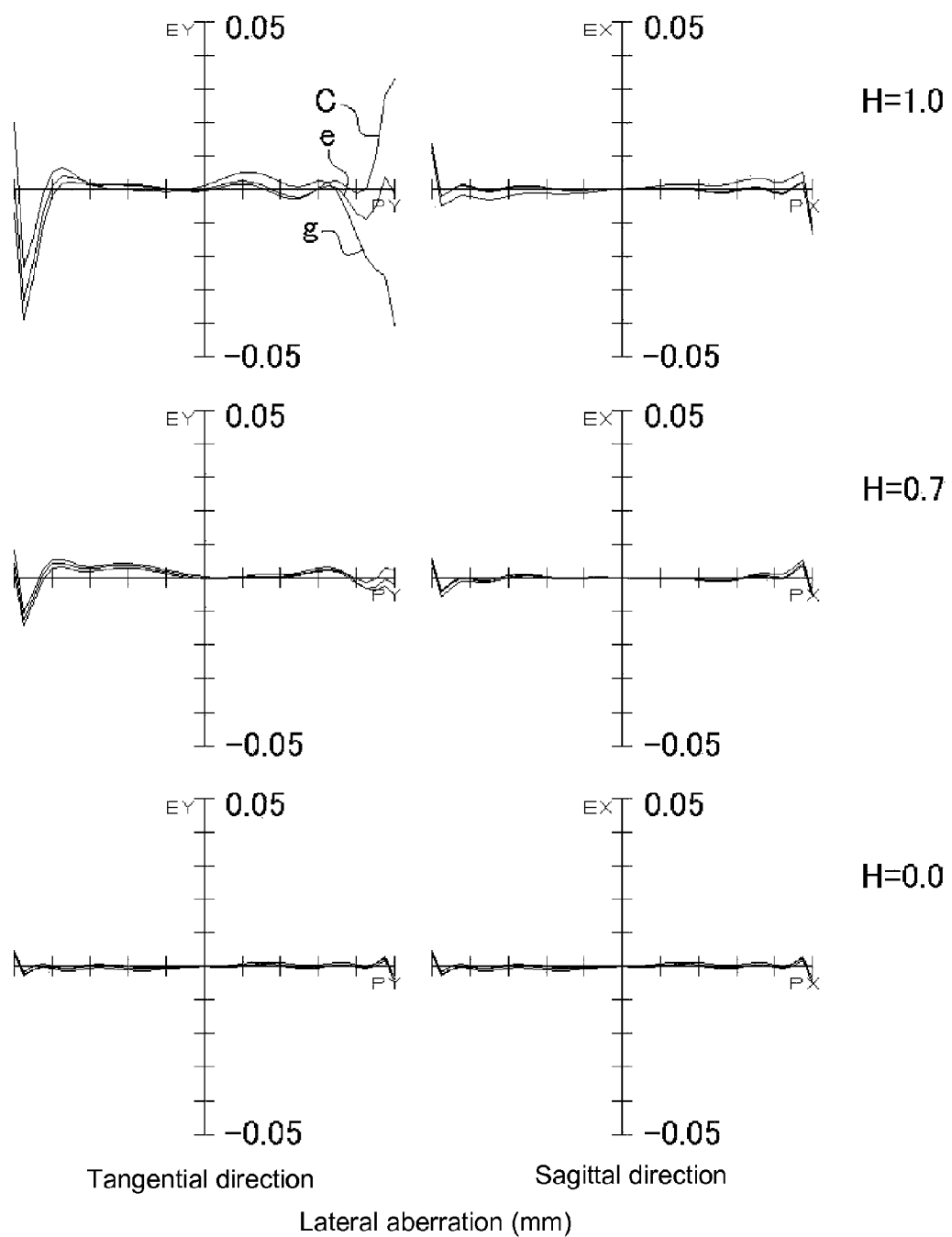
FIG. 14 is an aberration diagram showing a lateral aberration of the imaging lens of FIG. 13.
Figure 15:
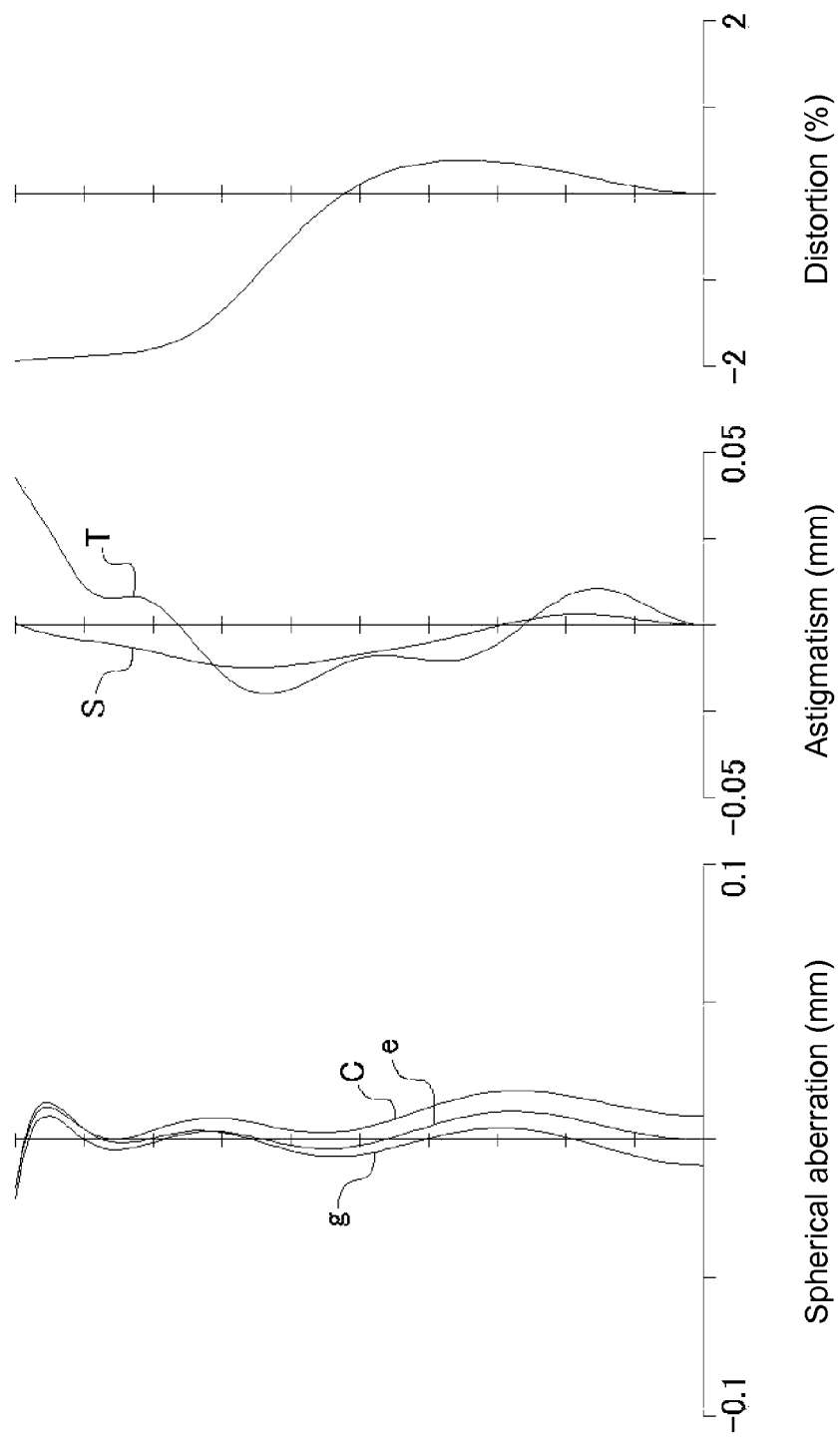
FIG. 15 is an aberration diagram showing a spherical aberration, astigmatism, and a distortion of the imaging lens of FIG. 13.
Figure 16:
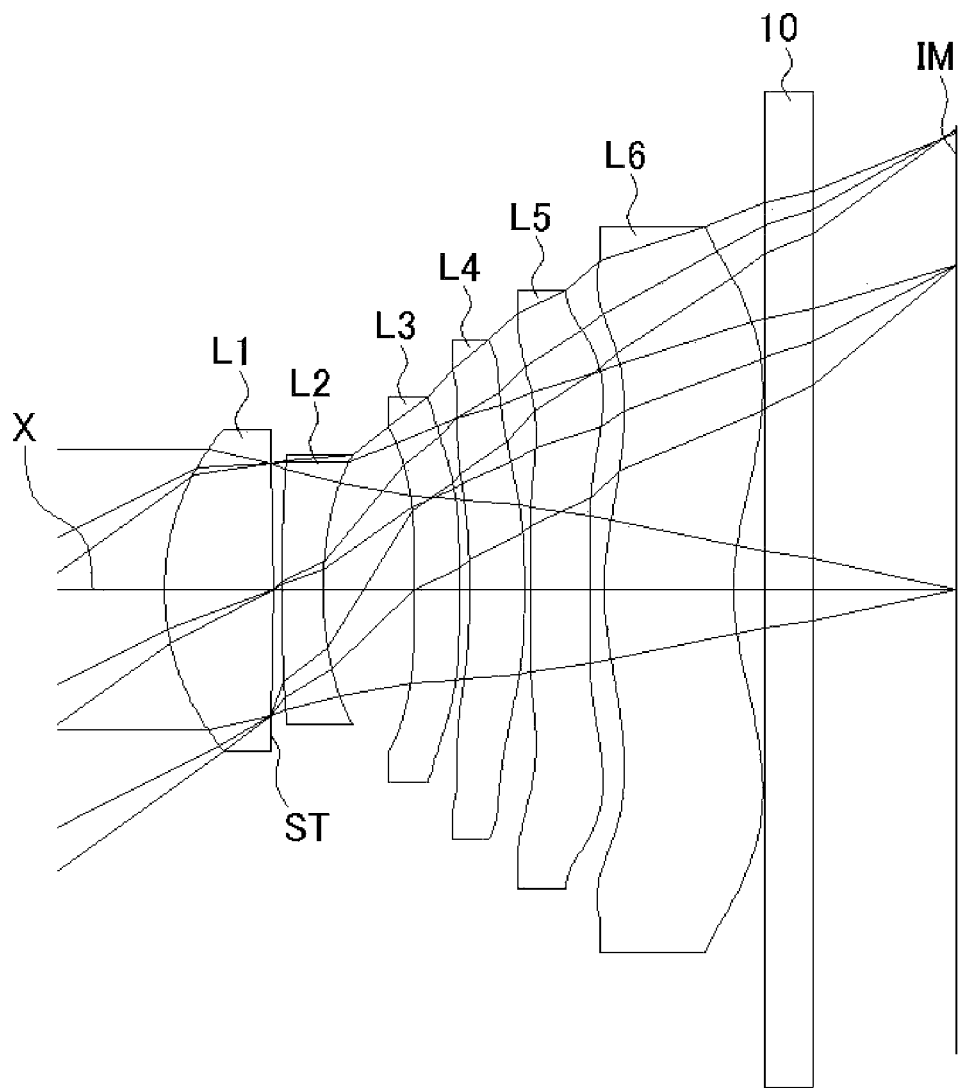
FIG. 16 shows a sectional view of a schematic configuration of an imaging lens in Numerical Data Example 6 according to the embodiment of the invention.

FIG. 14 shows the lateral aberration that corresponds to the image height ratio H of the imaging lens in Numerical Data Example 5 and FIG. 15 shows the spherical aberration (mm), the astigmatism (mm), and the distortion (%), respectively. As shown in FIGS. 14 and 15, according to the imaging lens of Numerical Data Example 5, the aberrations are satisfactorily corrected.

Numerical Data Example 6

Basic data are shown below.
f = 4.11 mm, Fno = 2.2, ω = 35.8°
Unit: mm

Surface Data

| Surface Number i | r | d | nd | vd |
|---|---|---|---|---|
| (Object) | ∞ | ∞ | | |
| 1* | 1.552 | 0.686 | 1.5350 | 56.1 (=vd1) |
| 2* (Stop) | −22.004 | 0.055 | | |
| 3* | 10.096 | 0.260 | 1.6355 | 24.0 (=vd2) |
| 4* | 2.181 | 0.581 (=D23) | | |
| 5* | −17.376 | 0.263 | 1.6355 | 24.0 (=vd3) |
| 6* | −1.6412 | 0.062 | | |
| 7* | −9.699 | 0.348 | 1.5350 | 56.1 (=vd4) |
| 8* | −13.337 | 0.041 | | |
| 9* | −8.558 | 0.380 | 1.5350 | 56.1 (=vd5) |
| 10* | −5.778 | 0.084 | | |
| 11* | 1.785 | 0.818 | 1.5350 | 56.1 (=vd6) |
| 12* | 1.501 | 0.200 | | |
| 13 | ∞ | 0.300 | 1.5168 | 64.2 |
| 14 | ∞ | 0.910 | | |
| (Image plane) | ∞ | | | | f1 = 2.73 mm
f2 = −4.39 mm
f3 = 413.53 mm
f4 = −68.52 mm
f5 = 31.63 mm
f6 = 57.92 mm
f12 = 5.11 mm
f34 = −81.37 mm
L16 = 3.598 mm

Aspheric Surface Data

First Surface k = 0.000, $A_4$ = −1.767E−03, $A_6$ = 3.088E−03, $A_8$ = 1.608E−02,
$A_{10}$ = −7.735E−02, $A_{12}$ = 9.643E−02, $A_{14}$ = −4.410E−02
Second Surface k = 0.000, $A_4$ = −3.573E−02, $A_6$ = 1.693E−01, $A_8$ = −2.785E−01,
$A_{10}$ = 1.771E−01, $A_{12}$ = 1.620E−02, $A_{14}$ = −6.102E−02
Third Surface k = 0.000, $A_4$ = −8.316E−02, $A_6$ = 2.926E−01, $A_8$ = −5.513E−01,
$A_{10}$ = 7.063E−01, $A_{12}$ = −5.504E−01, $A_{14}$ = 1.834E−01
Fourth Surface k = 0.000, $A_4$ = −4.204E−02, $A_6$ = 1.608E−01, $A_8$ = −2.128E−01,
$A_{10}$ = 3.952E−01, $A_{12}$ = −5.064E−01, $A_{14}$ = 2.762E−01
Fifth Surface k = 0.000, $A_4$ = −6.828E−02, $A_6$ = −2.723E−01, $A_8$ − 4.939E−01,
$A_{10}$ = −6.149E−01, $A_{12}$ = 5.947E−01, $A_{14}$ = −2.528E−01
Sixth Surface k = 0.000, $A_4$ = −7.912E−02, $A_6$ = −2.010E−01, $A_8$ = 2.598E−01,
$A_{10}$ = −8.081E−02
Seventh Surface k = 0.000, $A_4$ = −2.946E−01, $A_6$ = 5.469E−01, $A_8$ = −3.988E−01,
$A_{10}$ = 1.420E−01, $A_{12}$ = −2.145E−02
Eighth Surface k = 0.000, $A_4$ = −4.228E−01, $A_6$ = 7.864E−01, $A_8$ = −8.057E−01,
$A_{10}$ = 5.235E−01, $A_{12}$ = −2.070E−01, $A_{14}$ = 4.483E−02,
$A_{16}$ = −4.098E−03
Ninth Surface k = 0.000, $A_4$ = 3.027E−01, $A_6$ = −3.065E−01, $A_8$ = 1.083E−01,
$A_{10}$ = −1.408E−02, $A_{12}$ = 2.161E−03, $A_{14}$ = −1.109E−03,
$A_{16}$ = 1.731E−04

Basic data are shown below.
f = 4.11 mm, Fno = 2.2, ω = 35.8°
Unit: mm

Tenth Surface k = 0.000, $A_4$ = 3.516E−01, $A_6$ = −2.983E−01, $A_8$ = 1.102E−01,
$A_{10}$ = −1.422E−02, $A_{12}$ = −4.752E−03, $A_{14}$ = 1.986E−03,
$A_{16}$ = −1.991E−04
Eleventh Surface k = −7.985E−01, $A_4$ = −2.713E−01, $A_6$ = 1.640E−01, $A_8$ = −6.532E−02,
$A_{10}$ = 1.103E−02, $A_{12}$ = 2.609E−04, $A_{14}$ = −2.644E−04,
$A_{16}$ = 1.971E−05
Twelfth Surface k = −5.816, $A_4$ = −8.929E−02, $A_6$ = 2.946E−02, $A_8$ = −5.106E−03,
$A_{10}$ = −1.940E−03, $A_{12}$ = 1.156E−03, $A_{14}$ = −2.087E−04,
$A_{16}$ = 1.317E−05

The values of the respective conditional expressions are as follows:

$f1/f2 = -0.62$ $f12/f = 1.24$ $f/f4 = -0.060$ $f34/f = -19.80$ $D23/L16 = 0.16$

Accordingly, the imaging lens of Numerical Data Example 6 satisfies the above-described conditional expressions. A distance on the optical axis X from the object-side surface of the first lens L1 to the image plane IM (length in air) is 4.91 mm, and downsizing of the imaging lens is attained.

Figure 17:
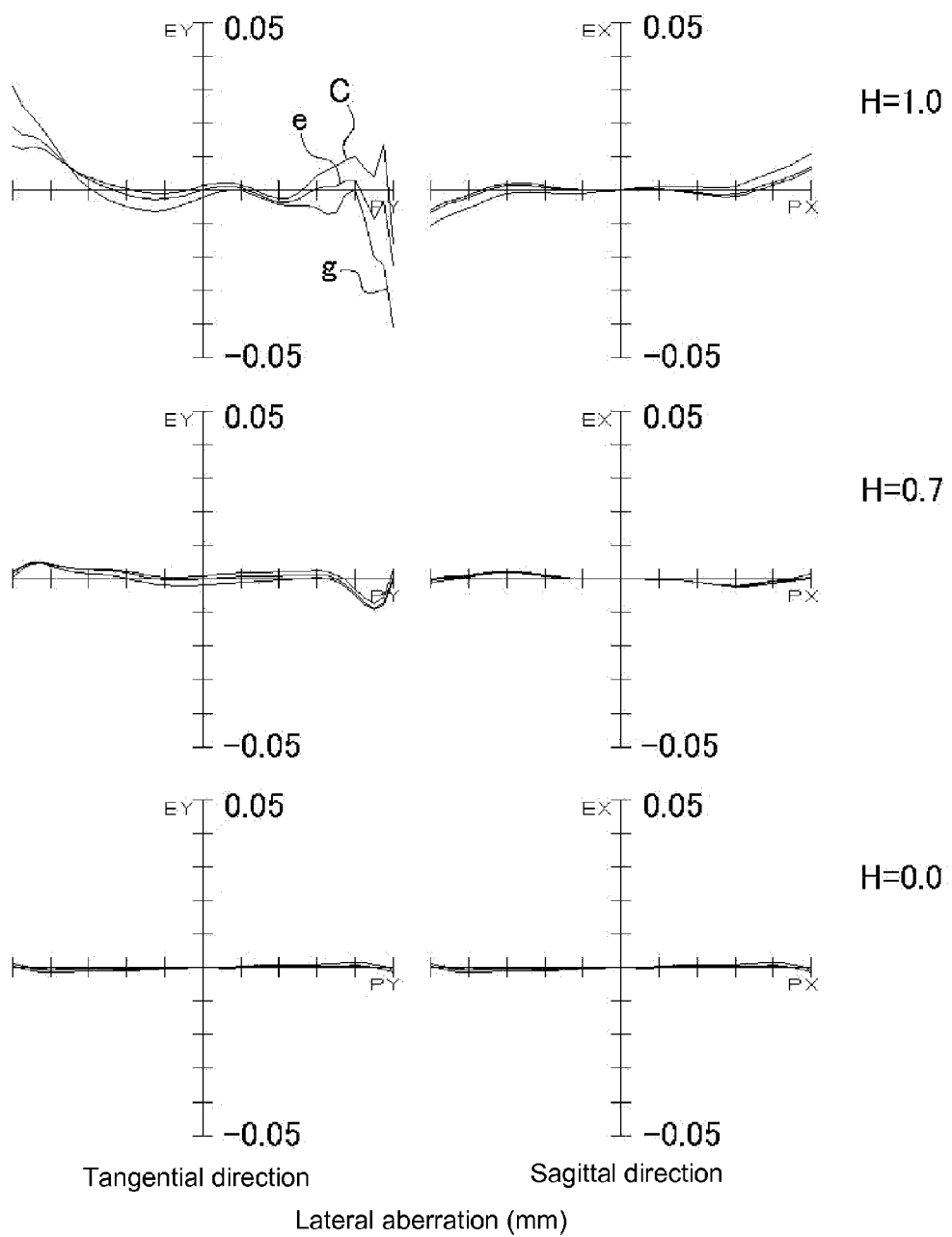
FIG. 17 is an aberration diagram showing a lateral aberration of the imaging lens of FIG. 16.
Figure 18:
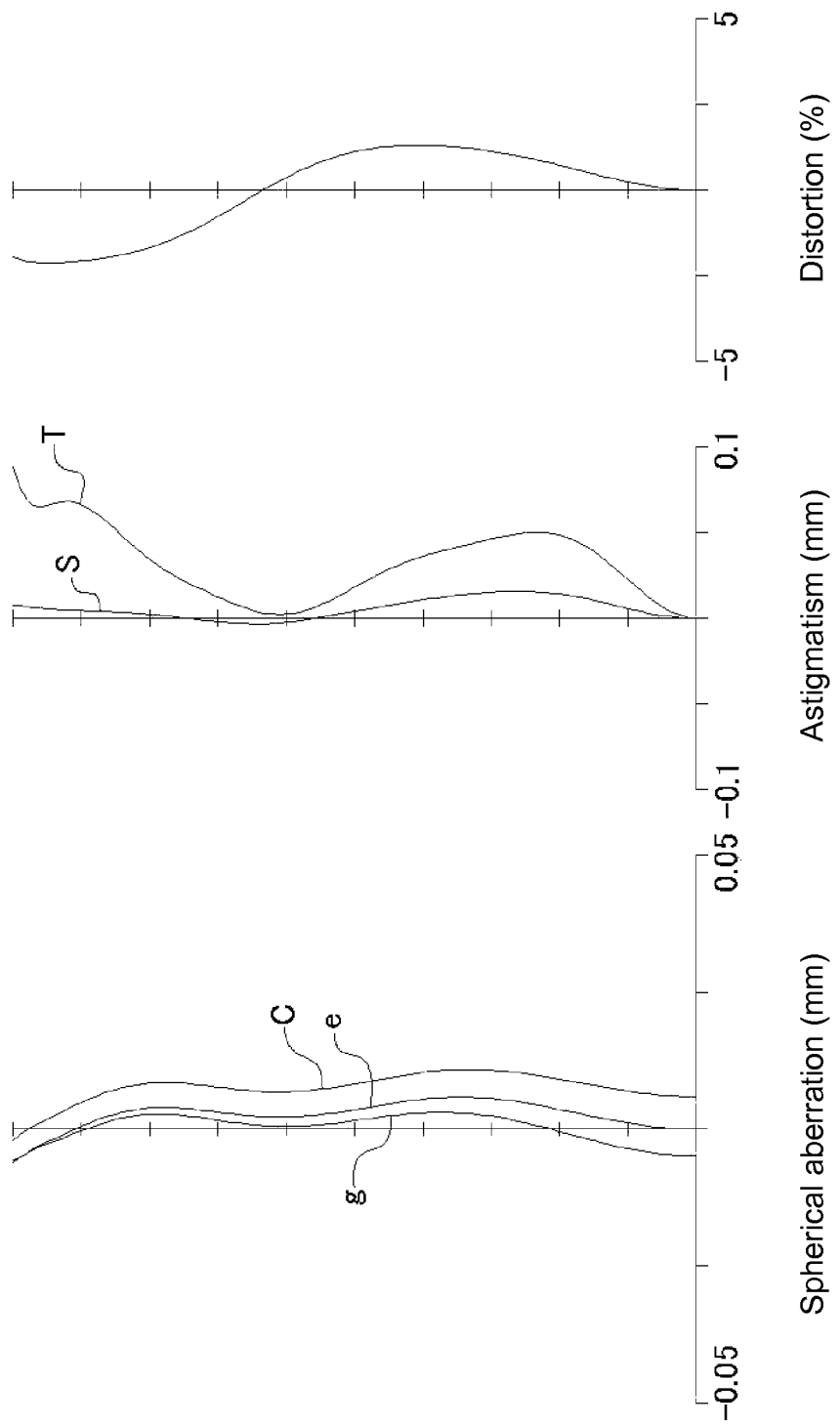
FIG. 18 is an aberration diagram showing a spherical aberration, astigmatism, and a distortion of the imaging lens of FIG. 16.

FIG. 17 shows the lateral aberration that corresponds to the image height ratio H of the imaging lens in Numerical Data Example 6 and FIG. 18 shows the spherical aberration (mm), the astigmatism (mm), and the distortion (%), respectively. As shown in FIGS. 17 and 18, according to the imaging lens of Numerical Data Example 6, the aberrations are satisfactorily corrected.

According to the imaging lens of the embodiment described above, it is possible to attain an angle of view (2ω) of 70° or greater. For reference, the angles of view in Numerical Data Examples 1 to 6 are within the range of 62.6° to 71.6°. According to the imaging lens of the embodiment, it is possible to take an image in a wider range than a conventional imaging lens.

In addition, in these days, a high resolution imaging element is frequently combined with an imaging lens for a purpose of improving camera performances. Since a light-receiving area of each pixel is smaller in case of such high resolution imaging element, an image taken tends to be dark. As a method to correct such darkness, there is a method of improving light-receiving sensitivity of an imaging element using an electric circuit. However, when the light-receiving sensitivity is high, a noise component that does not directly contribute to image formation is also amplified, so that another circuit is required to reduce the noise. According to the Numerical Data Examples 1 to 6, Fno is very small, i.e. as small as 2.0 to 2.3. According to the imaging lens of the embodiment, it is possible to obtain a sufficiently bright image without the above-described electric circuit.

Accordingly, when the imaging lens of the embodiment is applied in an optical system such as a camera to be mounted in a portable device including cellular phones, portable information terminal, and smartphones, digital still cameras, security cameras, vehicle onboard cameras, and network cameras, it is possible to attain both high functionality and downsizing of the cameras.

The invention can be applied in an imaging lens for mounting in a relative small camera, such as cameras mounted in portable devices including cellular phones, smartphones, and portable information terminals, digital still cameras, security cameras, vehicle onboard cameras, and network cameras.

The disclosure of Japanese Patent Application No. 2012-116110, filed on May 22, 2012, is incorporated in the application by reference.

While the invention has been explained with reference to the specific embodiments of the invention, the explanation is illustrative and the invention is limited only by the appended claims.

What is claimed is:

1. An imaging lens comprising:
   a first lens having positive refractive power;
   a second lens;
   a third lens;
   a fourth lens having negative refractive power;
   a fifth lens; and
   a sixth lens, arranged in this order from an object side to an image plane side,
   wherein said third lens is formed in a shape so that a surface thereof on the image plane side has a negative curvature radius,
   said fifth lens is formed in a shape so that a surface thereof on the object side and a surface thereof on the image plane side have negative curvature radii, and
   said sixth lens is formed in a shape so that a surface thereof on the object side and a surface thereof on the image plane side have positive curvature radii.

2. The imaging lens according to claim 1, wherein each of said third lens, said fourth lens, said fifth lens, and said sixth lens has refractive power weaker than that of each of the first lens and the second lens.

3. The imaging lens according to claim 1, wherein said fourth lens is formed in a shape so that a surface thereof on the object side and a surface thereof on the image plane side have negative curvature radii.

4. The imaging lens according to claim 1, wherein said first lens has a focal length f1, and said second lens has a focal length f2 so that the following conditional expression is satisfied:

$$-0.7 < f1/f2 < -0.3.$$

5. The imaging lens according to claim 1, wherein said first lens and said second lens have a composite focal length f12 so that the following conditional expression is satisfied:

$$0.8 < f12/f < 1.5$$

where f is a focal length of a whole lens system.

6. The imaging lens according to claim 1, wherein said fourth lens has a focal length f4 so that the following conditional expression is satisfied:

$$-0.3 < f/f4 < -0.01$$

where f is a focal length of a whole lens system.

7. The imaging lens according to claim 1, wherein said third lens and said fourth lens have a composite focal length f34 so that the following conditional expression is satisfied:

$$-20.0 < f34/f < -1.0$$

where f is a focal length of a whole lens system.

8. The imaging lens according to claim 1, wherein said second lens has a surface on the image plane side situated away from a surface of the third lens on the object side by a distance D23 on an optical axis, and said first lens has a surface on the object side situated away from a surface of the sixth lens on the image plane side by a distance L16 on the optical axis so that the following conditional expression is satisfied:

$$0.05 < D23/L16 < 0.3.$$

9. The imaging lens according to claim 1, wherein said first lens has an Abbe's number vd1, said fourth lens has an Abbe's number vd4, said fifth lens has an Abbe's number vd5, and said sixth lens has an Abbe's number vd6 so that the following conditional expressions are satisfied:

$$45 < vd1 < 75$$

$$45 < vd4 < 75$$

$$45 < vd5 < 75$$

$$45 < vd6 < 75.$$

10. The imaging lens according to claim 1, wherein said second lens has an Abbe's number vd2, and said third lens has an Abbe's number vd3 so that the following conditional expressions are satisfied:

$$20 < vd2 < 40$$

$$20 < vd3 < 40.$$

11. An imaging lens comprising:
    a first lens having positive refractive power;
    a second lens;
    a third lens;
    a fourth lens;
    a fifth lens; and
    a sixth lens, arranged in this order from an object side to an image plane side,
    wherein said third lens is formed in a shape so that a surface thereof on the image plane side has a negative curvature radius,
    said fourth lens is formed in a shape so that a surface thereof on the image plane side has a negative curvature radius, and
    said third lens and said fourth lens have a composite focal length f34 so that the following conditional expression is satisfied:

$$-20.0 < f34/f < -1.0$$

where f is a focal length of a whole lens system.

12. The imaging lens according to claim 11, wherein each of said third lens, said fourth lens, said fifth lens, and said sixth lens has refractive power weaker than that of each of the first lens and the second lens.

13. The imaging lens according to claim 11, wherein said fifth lens is formed in a shape so that a surface thereof on the object side and a surface thereof on the image plane side have negative curvature radii.

14. The imaging lens according to claim 11, wherein said sixth lens is formed in a shape so that a surface thereof on the object side and a surface thereof on the image plane side have positive curvature radii.

15. The imaging lens according to claim 11, wherein said first lens has a focal length f1, and said second lens has a focal length f2 so that the following conditional expression is satisfied:

$-0.7 < f1/f2 < -0.3$.

16. The imaging lens according to claim 11, wherein said first lens and said second lens have a composite focal length f12 so that the following conditional expression is satisfied:

$0.8 < f12/f < 1.5$ where f is a focal length of a whole lens system.

17. The imaging lens according to claim 11, wherein said fourth lens has a focal length f4 so that the following conditional expression is satisfied:

$-0.3 < f/f4 < -0.01$ where f is a focal length of a whole lens system.

18. The imaging lens according to claim 11, wherein said second lens has a surface on the image plane side situated away from a surface of the third lens on the object side by a distance D23 on an optical axis, and said first lens has a surface on the object side situated away from a surface of the sixth lens on the image plane side by a distance L16 on the optical axis so that the following conditional expression is satisfied:

$0.05 < D23/L16 < 0.3$.

19. The imaging lens according to claim 11, wherein said first lens has an Abbe's number vd1, said fourth lens has an Abbe's number vd4, said fifth lens has an Abbe's number vd5, and said sixth lens has an Abbe's number vd6 so that the following conditional expressions are satisfied:

$45 < vd1 < 75$ $45 < vd4 < 75$ $45 < vd5 < 75$ $45 < vd6 < 75$.

20. The imaging lens according to claim 11, wherein said second lens has an Abbe's number vd2, and said third lens has an Abbe's number vd3 so that the following conditional expressions are satisfied:

$20 < vd2 < 40$ $20 < vd3 < 40$.

* * * * *